US 6,594,218 B2

(12) United States Patent
Kikuchi et al.

(10) Patent No.: US 6,594,218 B2
(45) Date of Patent: Jul. 15, 2003

(54) DISK DEVICE HAVING DISK TRANSFERRING MECHANISM CAPABLE OF BEING MADE THIN

(75) Inventors: Hideo Kikuchi, Miyagi-ken (JP); Takashi Nakashima, Miyagi-ken (JP); Hitoshi Ikeda, Fukushima-ken (JP)

(73) Assignee: Alps Electric Co., Ltd., Tokyo (JP)

( * ) Notice: Subject to any disclaimer, the term of this patent is extended or adjusted under 35 U.S.C. 154(b) by 141 days.

(21) Appl. No.: 09/804,433

(22) Filed: Mar. 12, 2001

(65) Prior Publication Data

US 2001/0021157 A1 Sep. 13, 2001

(30) Foreign Application Priority Data

Mar. 13, 2000 (JP) .......................... 2000-074007

(51) Int. Cl.[7] .............................. G11B 17/04
(52) U.S. Cl. ........................................ 369/77.1
(58) Field of Search .......................... 369/75.2, 77.1, 369/191, 193, 192, 77.2, 75.1, 187; 360/92, 85

(56) References Cited

U.S. PATENT DOCUMENTS

| | | | | |
|---|---|---|---|---|
| 5,831,956 A | * | 11/1998 | Sawai et al. ............... | 369/75.2 |
| 5,878,011 A | * | 3/1999 | Nakamichi ................. | 369/75.1 |
| 6,345,030 B1 | * | 2/2002 | Sakurai et al. ............. | 369/192 |
| 6,392,980 B1 | * | 5/2002 | Sato et al. .................. | 369/192 |
| 6,449,234 B1 | * | 9/2002 | Ahn et al. .................. | 369/77.1 |
| 6,452,888 B1 | * | 9/2002 | Eguchi ....................... | 369/77.1 |
| 6,469,971 B1 | * | 10/2002 | Sato et al. .................. | 369/77.1 |
| 6,469,972 B1 | * | 10/2002 | Morimoto et al. ......... | 369/77.1 |
| 6,473,372 B2 | * | 10/2002 | Yoshida et al. ............. | 369/30.9 |
| 6,477,121 B1 | * | 11/2002 | Sato et al. .................. | 369/30.88 |
| 6,480,442 B1 | * | 11/2002 | Nakatani et al. ........... | 369/30.36 |
| 6,512,730 B1 | * | 1/2003 | Lee et al. ................... | 369/77.1 |

FOREIGN PATENT DOCUMENTS

JP        6-111443        4/1994

* cited by examiner

Primary Examiner—Brian E. Miller
Assistant Examiner—Minh Le
(74) Attorney, Agent, or Firm—Brinks Hofer Gilson & Lione

(57) ABSTRACT

There is provided a disk device wherein an insertion/ejection slot for a disk, and two upper and lower disk D transferring paths connected to the insertion/ejection slot are provided; between the upper transferring path and the lower transferring path, a transferring roller for transferring the disk is disposed; an upper roller portion and a lower roller portion of the transferring roller are disposed so as to face the upper and lower transferring paths, respectively; in the upper roller portion and the lower roller portion, there are provided pressing members, having pressing surfaces to be arranged so as to oppose to each other; and the disk is caught between the pressing surface and the upper roller portion, or between the pressing surface and the lower roller portion to rotate the transferring roller thereby transferring the disk.

3 Claims, 23 Drawing Sheets

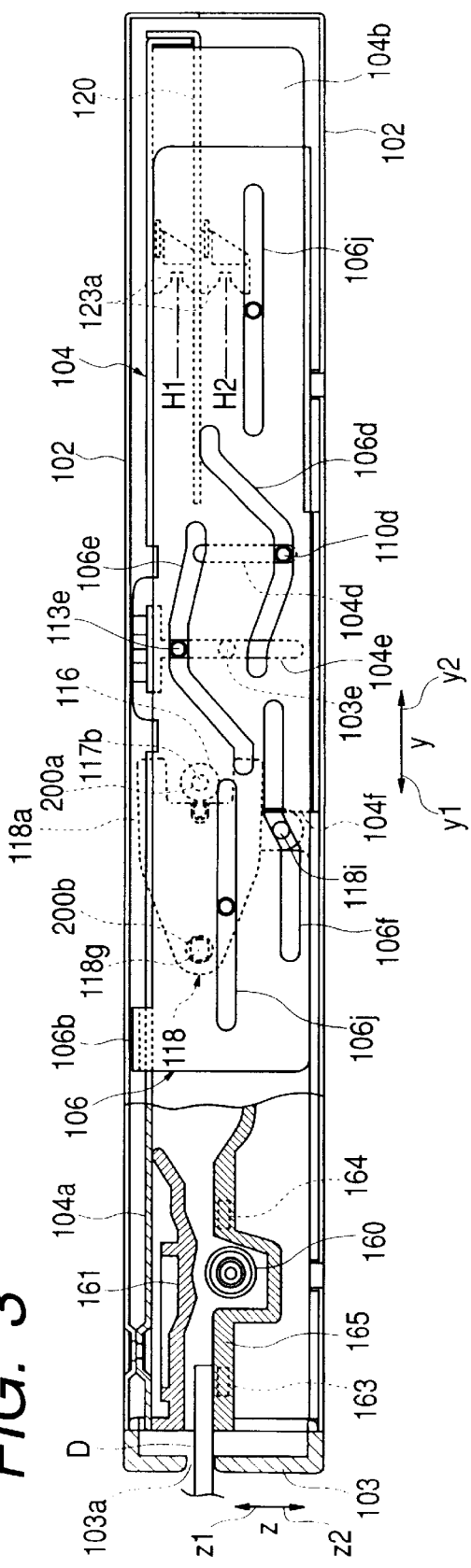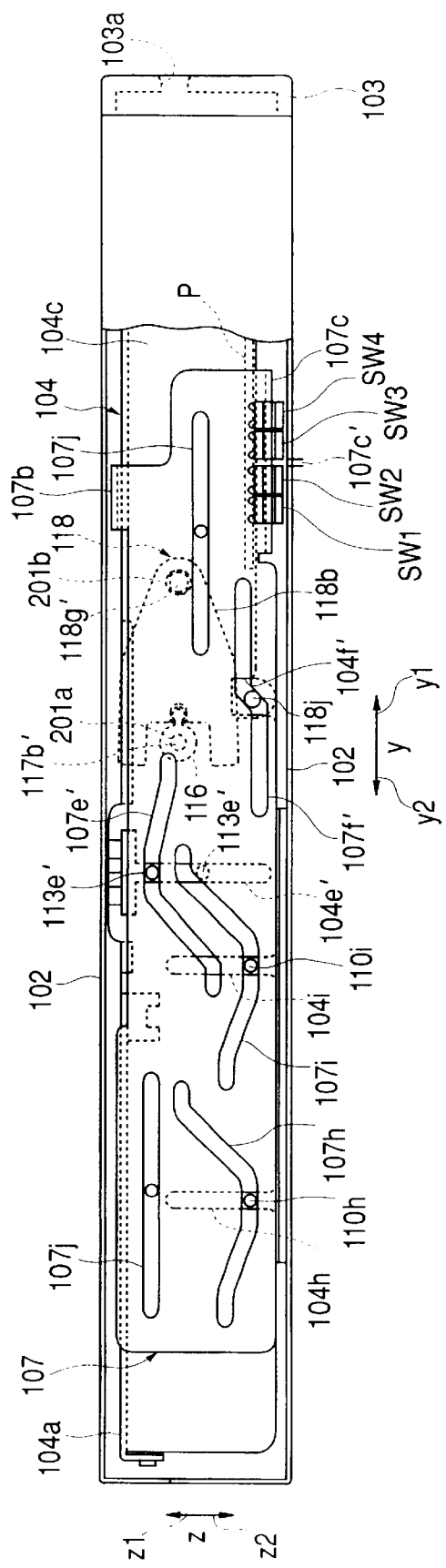

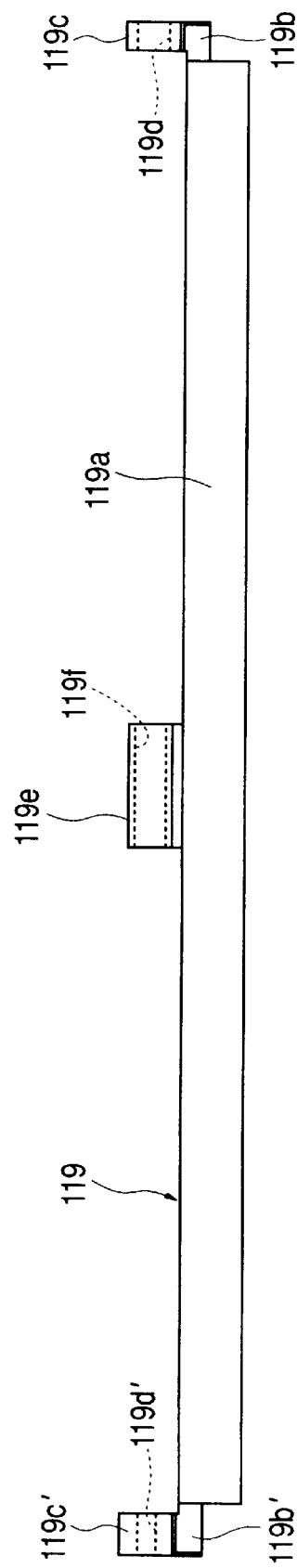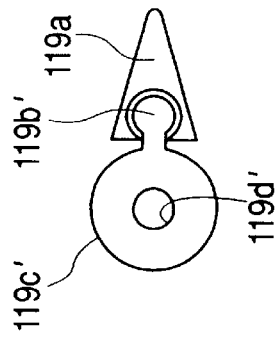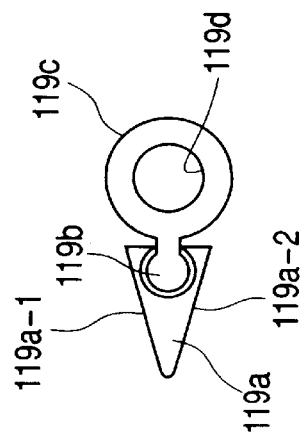

DISK DEVICE HAVING DISK TRANSFERRING MECHANISM CAPABLE OF BEING MADE THIN

BACKGROUND OF THE INVENTION

1. Field of the Invention

The present invention relates to a disk device for recording on or reproducing from a disk such as CD (Compact Disk), and DVD (Digital Versatile Disk, or Digital Video Disk), and more particularly to a disk device capable of simplifying its structure.

2. Description of the Related Art

FIG. 41 is an explanatory view for illustrating a conventional disk device.

As the conventional disk device, there has been a disk device in which an insertion slot and an ejection slot for the disk are provided up and down, disk transferring paths coupled to these insertion slot and ejection slot are provided up and down, respectively, and each disk transferring path has been provided with a feeding roller for feeding a disk, respectively.

In the disk device 50 shown in FIG. 41, a front panel 51A is provided with an inlet 52 and an outlet 53 for a disk, and feeding rollers 60, 61 and 58 are provided up and down so as to correspond to the inlet 52 and the outlet 53, respectively.

A first disk 56 inserted through an inlet 52 is fed to a chucking table 13 by feeding rollers 60 and 61 to be chucked, and is rotationally driven by a spindle motor 57 so that a disk driving operation such as recording or reproduction is performed. Thus, when a new second disk 54 is inserted into the inlet 52 while the first disk 56 is being driven, the driving of the first disk 56 is stopped, and the first disk 56 lowers on a lower feeding roller 58 for unloading.

The first disk 56 is carried out to the outlet 53 by the lower feeding roller 58, and the second disk 54 is fed to the chucking table 13 by the upper feeding rollers 60 and 61 to be chucked, and is rotationally driven by the spindle motor 57 so that a disk driving operation such as recording or reproduction is performed.

In a conventional disk device, however, since the feeding rollers 61 and 58 are disposed at an insertion slot 52 and an ejection slot 53 of the disk, respectively, there is a problem that the structure becomes complicated and the component count is also increased. Also, on the side of the lower ejection slot 53, it is necessary to provide a driving mechanism (not shown) for rotationally driving the feeding roller 58, and in order to avoid any interference with a driving mechanism (not shown) for the upper feeding roller 61, the driving mechanism is often disposed on the lower part side of the feeding roller 58, and as a result, the disk device may be prevented from being made thin.

SUMMARY OF THE INVENTION

It is an object of the present invention to provide a disk device having a simple structure, capable of being made thin.

As a first apparatus for solving the above-described problems, there is provided a disk device wherein an insertion/ejection slot for inserting or ejecting a disk, and two upper and lower disk transferring paths connected to the insertion/ejection slot are provided; between the upper transferring path and the lower transferring path, a transferring roller for transferring a disk is disposed in such a manner as to be rotatable in a forward or backward direction; an upper roller portion and a lower roller portion of the transferring roller are disposed so as to face the upper and lower transferring paths, respectively; in the upper roller portion and the lower roller portion, there are provided pressing members, having pressing surfaces to be arranged so as to oppose to each other; at least one of the transferring roller and the pressing member is made movable in directions to be brought into and out of contact; and the disk is caught between the pressing surface and the upper roller portion, or between the pressing surface and the lower roller portion to rotate the transferring roller in a forward or backward direction for thereby transferring the disk.

Further, as a second apparatus, there is provided a disk device constructed such that there are provided a first driving position and a second driving position whereat disks are transferred along the upper and lower transferring paths, respectively; there are provided a driving unit capable of ascending and descending in a direction orthogonal to the disk surface, and a cam member, with which the driving unit comes into engagement; and the disk is mounted for driving by causing the driving unit to ascend or descend correspondingly to the disk transferred to either of the first and second driving positions in synchronization with the movement of the cam member, wherein the pressing member is caused to engage with the cam member, and the pressing member is caused to move in synchronization with movement of the cam member to another predetermined position, whereby each of the pressing surfaces is caused to move in directions to be brought into and out of contact with the upper roller portion and the lower roller portion, respectively.

Further, as a third apparatus, there is provided a disk device constructed such that there is one above-described insertion/ejection slot, and there is provided a distributing mechanism for selectively changing over the transferring direction of the disk inserted through the insertion/ejection slot to the direction of the upper or lower transferring path, and the disk, whose direction has been changed over, is transferred along the upper or lower transferring path by a feeding force of the transferring roller.

BRIEF DESCRIPTION OF THE DRAWINGS

FIG. 3 is a partial sectional right side view of the device shown in FIG. 1;

FIG. 4 is a left side view of the device shown in FIG. 1;

FIG. 24 is a plan view showing a distributing plate of a disk device according to an embodiment of the present invention;

FIG. 25 is a right side view of the distributing plate shown in FIG. 24;

FIG. 26 is a left side view of the distributing plate shown in FIG. 24;

DETAILED DESCRIPTION OF THE PREFERRED EMBODIMENTS

Hereinafter, with reference to FIGS. 1 to 35, the description will be made of a disk device 100 according to an embodiment of the present invention.

Figure 1:
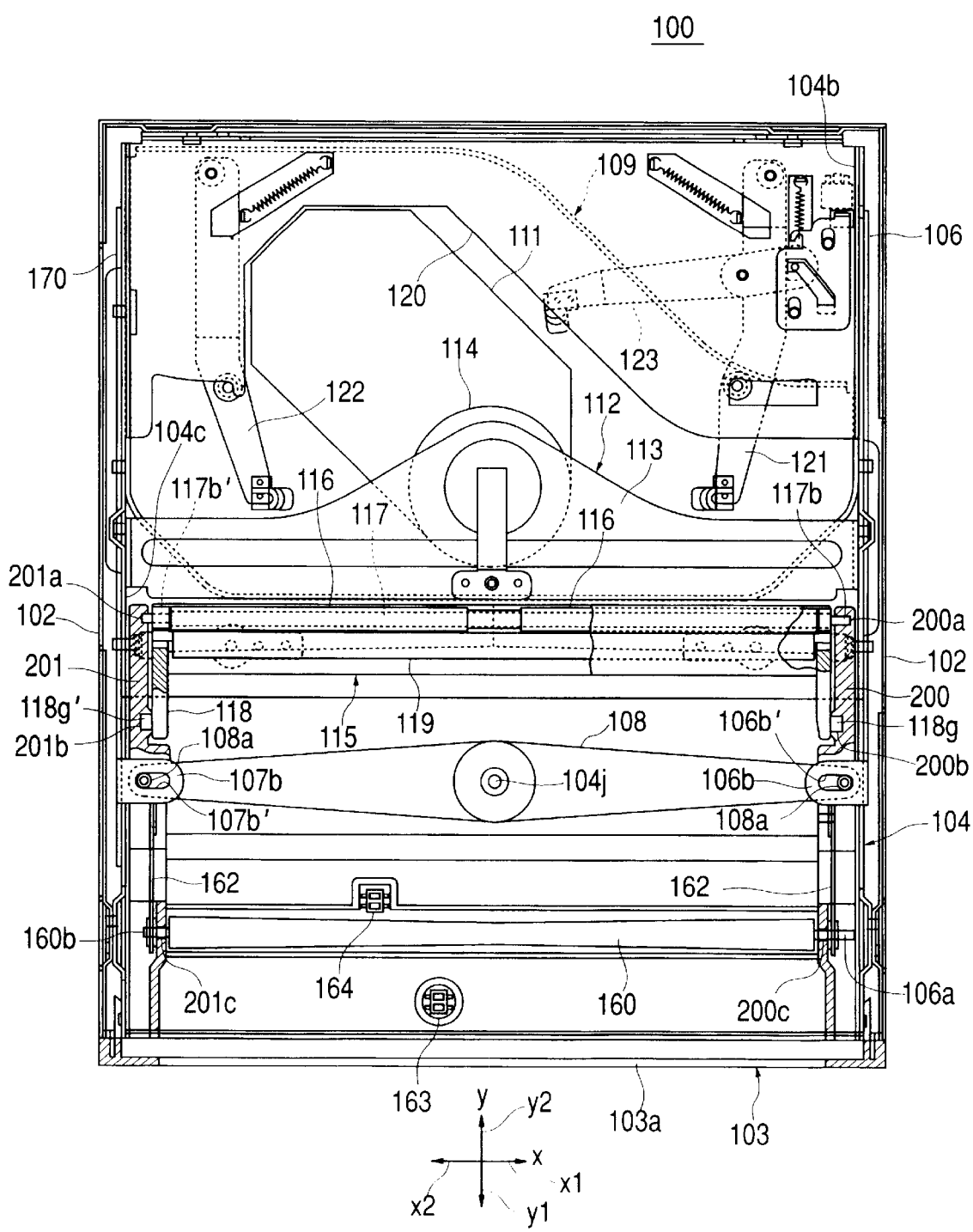
FIG. 1 is a partial sectional plan view showing a disk device according to an embodiment of the present invention.
Figure 2:
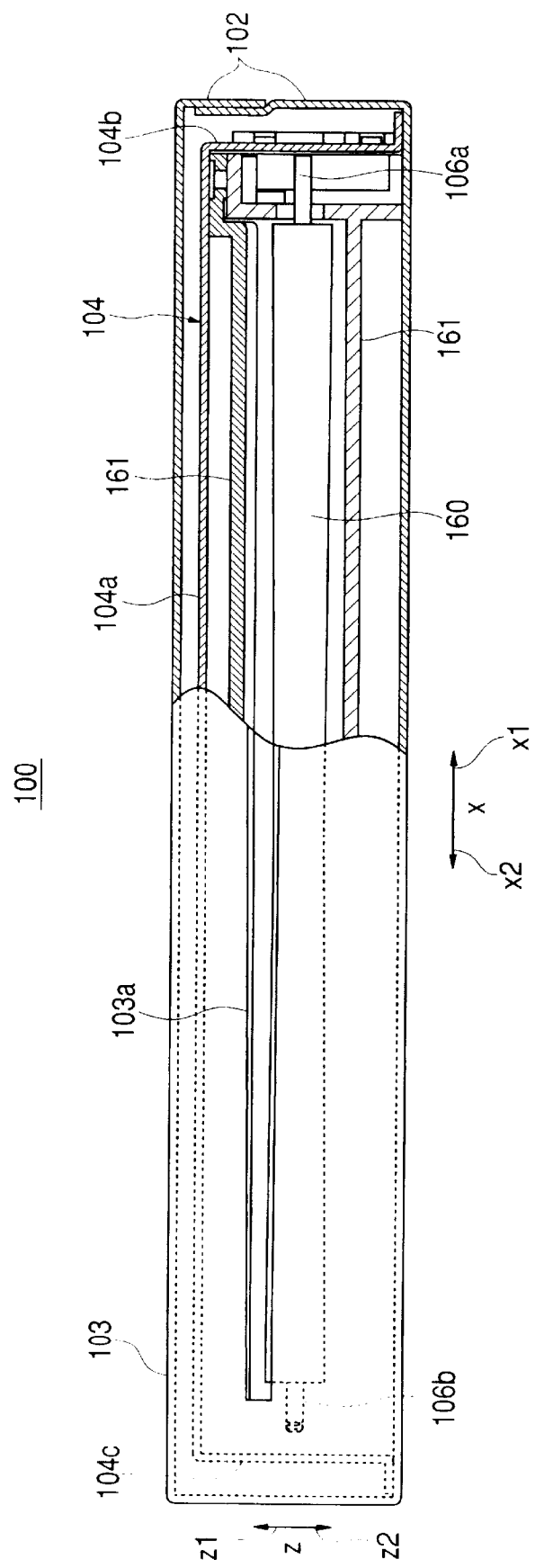
FIG. 2 is a partial sectional front view showing a disk device according to an embodiment of the present invention.
Figure 5:
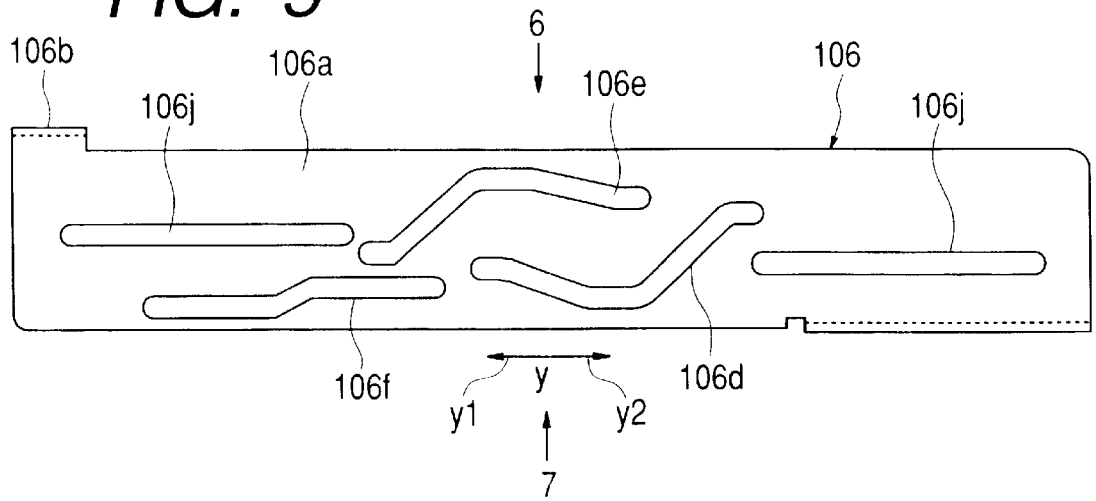
FIG. 5 is a plan view showing a movable member of a disk device according to an embodiment of the present invention.
Figure 6:
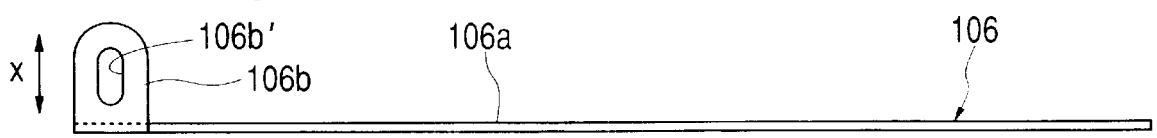
FIG. 6 is a view as viewed from a direction VI of FIG. 5.
Figure 7:
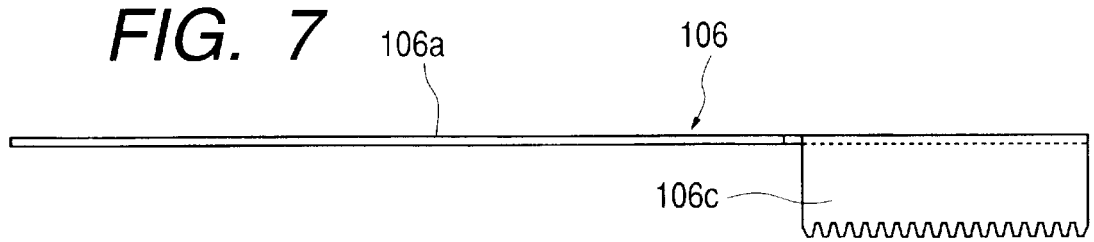
FIG. 7 is a view as viewed from a direction VII of FIG. 5.
Figure 8:
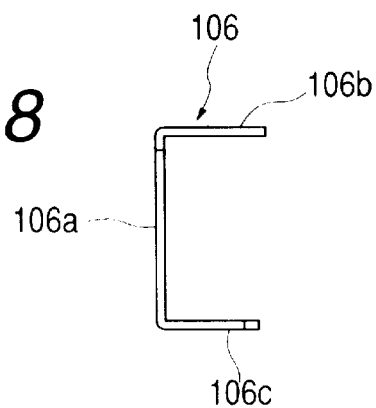
FIG. 8 is a right side view of the movable member shown in FIG. 5.
Figure 9:
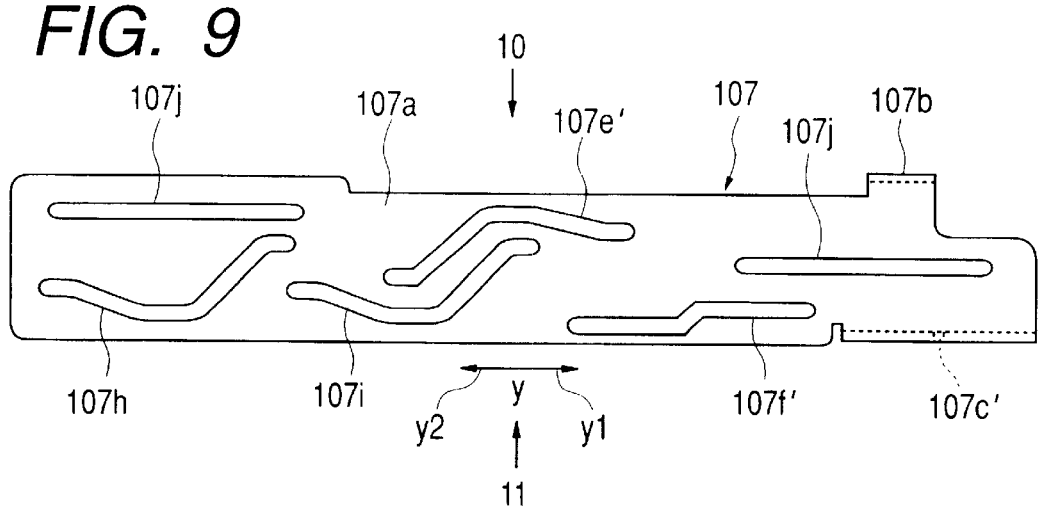
FIG. 9 is a plan view showing a movable member of a disk device according to an embodiment of the present invention.
Figure 10:
FIG. 10 is a view as viewed from a direction X of FIG. 9.
Figure 11:
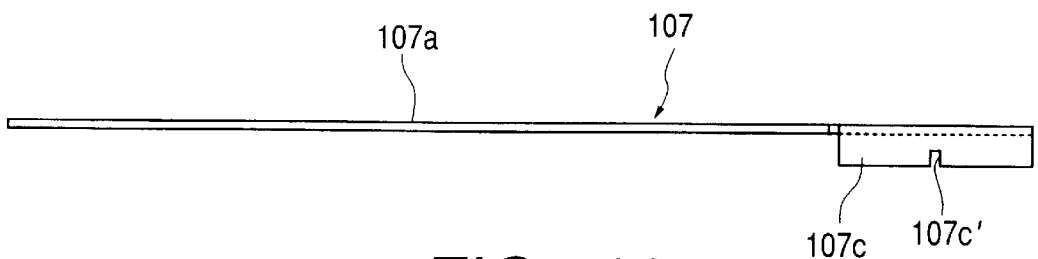
FIG. 11 is a view as viewed from a direction XI of FIG. 9.
Figure 12:
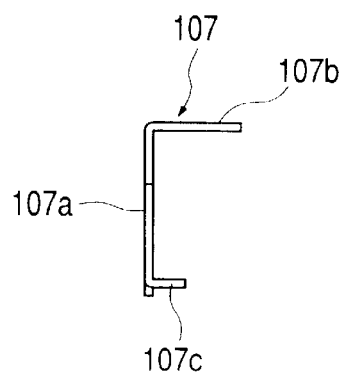
FIG. 12 is a right side view of the movable member shown in FIG. 9.

FIG. 1 is a partial sectional plan view showing a disk device according to an embodiment of the present invention; FIG. 2 is a partial sectional front view showing the same disk device; FIG. 3 is a partial sectional right side view in FIG. 1; FIG. 4 is a left side view in FIG. 1; FIG. 5 is a plan view showing a movable member 106; FIG. 6 is a view as viewed from a direction 6 in FIG. 5; FIG. 7 is a view as viewed from a direction 7 in FIG. 5; FIG. 8 is a right side view in FIG. 5; FIG. 9 is a plan view showing a movable member 107; FIG. 10 is a view as viewed from a direction 10 in FIG. 9; FIG. 11 is a view as viewed from a direction 11 in FIG. 9; and FIG. 12 is a right side view in FIG. 9.

Figure 13:
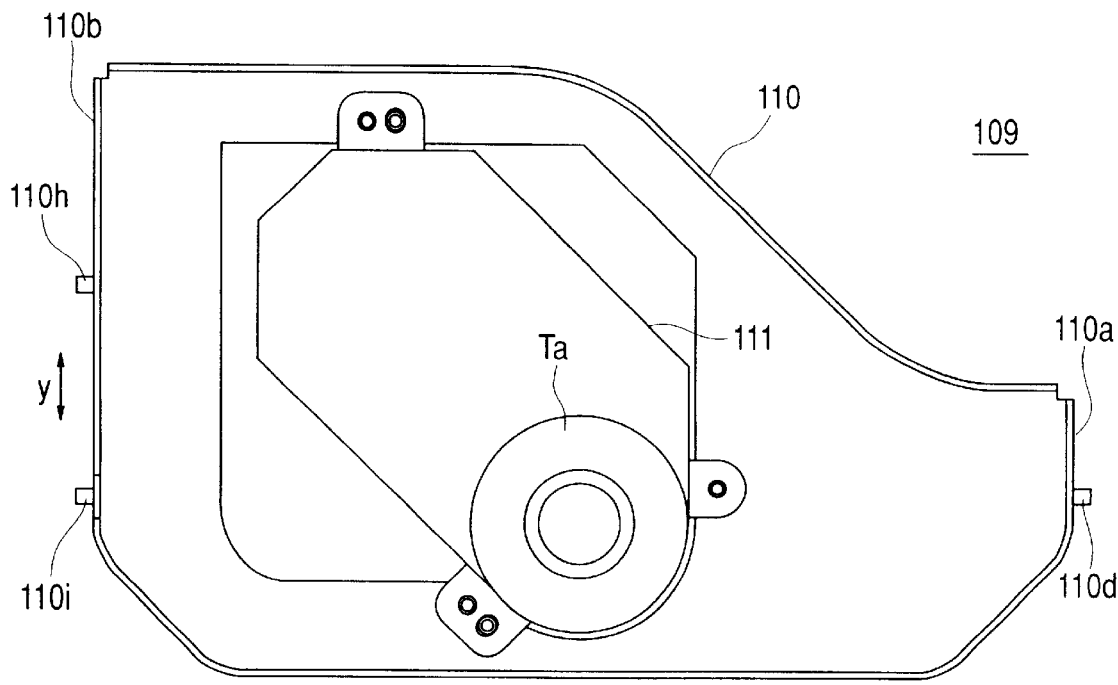
FIG. 13 is a plan view showing a driving unit of a disk device according to an embodiment of the present invention.
Figure 14:
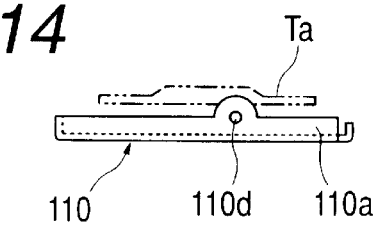
FIG. 14 is a right side view of the driving unit shown in FIG. 13.
Figure 15:
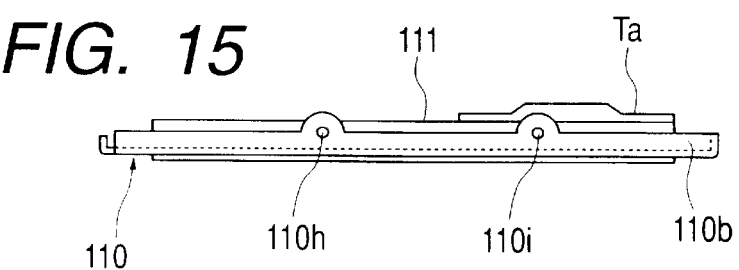
FIG. 15 is a left side view of the driving unit shown in FIG. 13.
Figure 16:
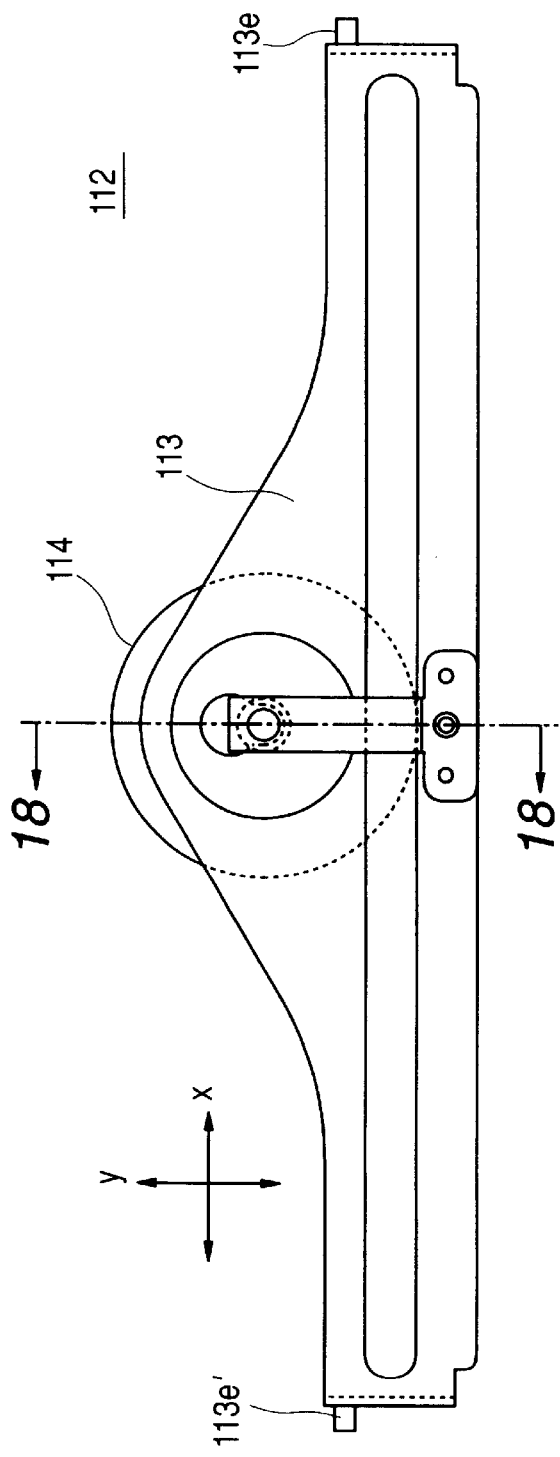
FIG. 16 is a plan view showing a damper member of a disk device according to an embodiment of the present invention.
Figure 17:
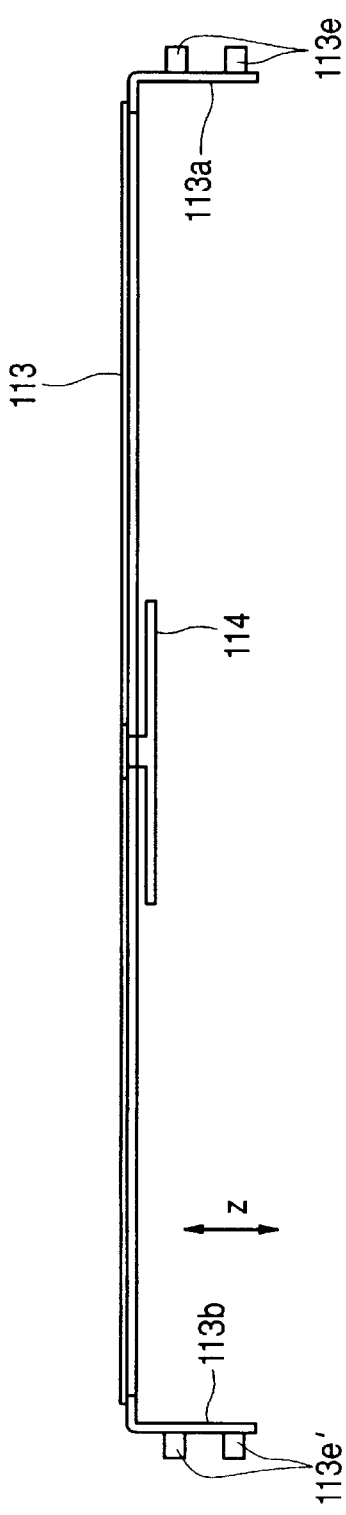
FIG. 17 is a front view showing a damper member of a disk device according to an embodiment of the present invention.
Figure 18:
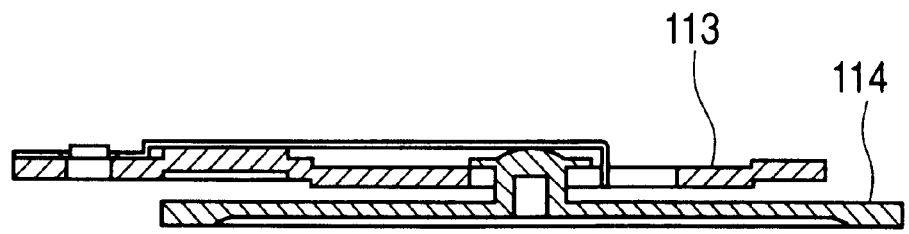
FIG. 18 is a sectional view taken on line XVIII—XVIII of FIG. 16.
Figure 19:
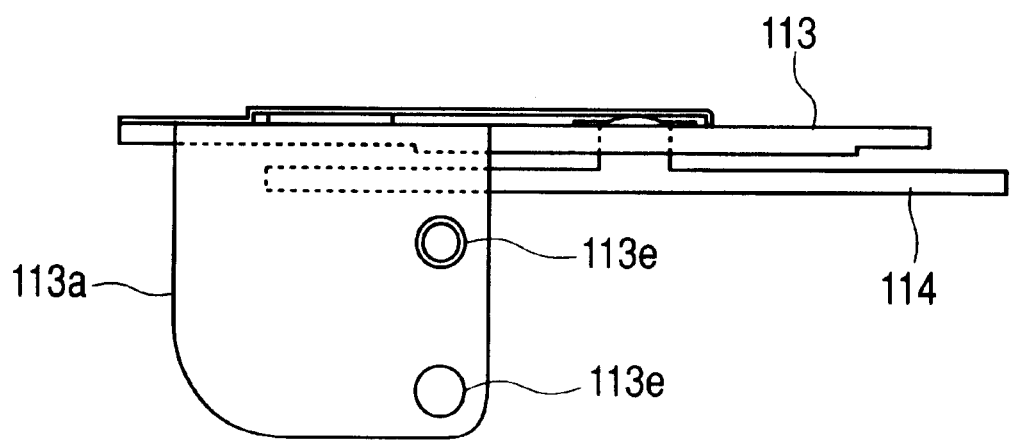
FIG. 19 is a right enlarged side view of the damper member shown in FIG. 16.
Figure 20:
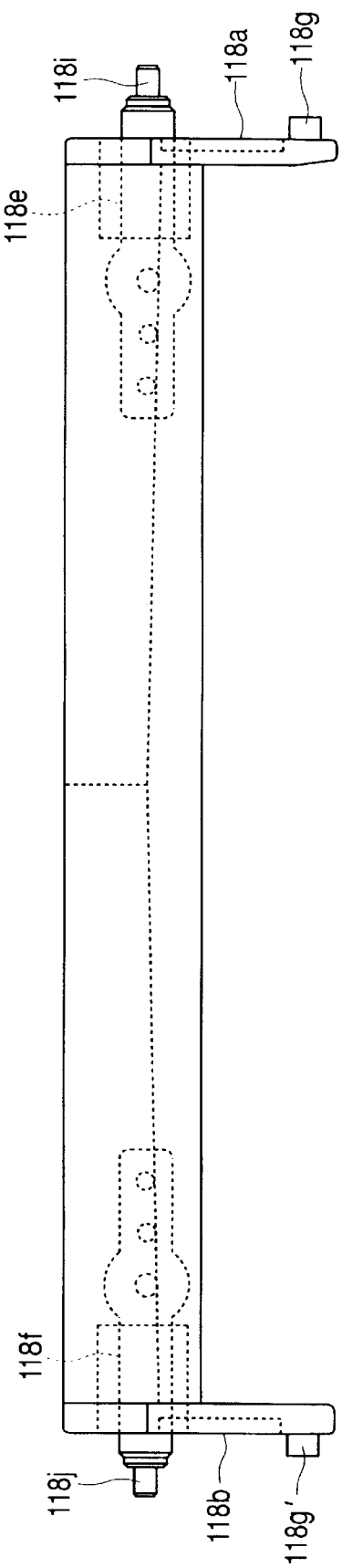
FIG. 20 is a plan view showing a pressing member of a disk device according to an embodiment of the present invention.
Figure 21:
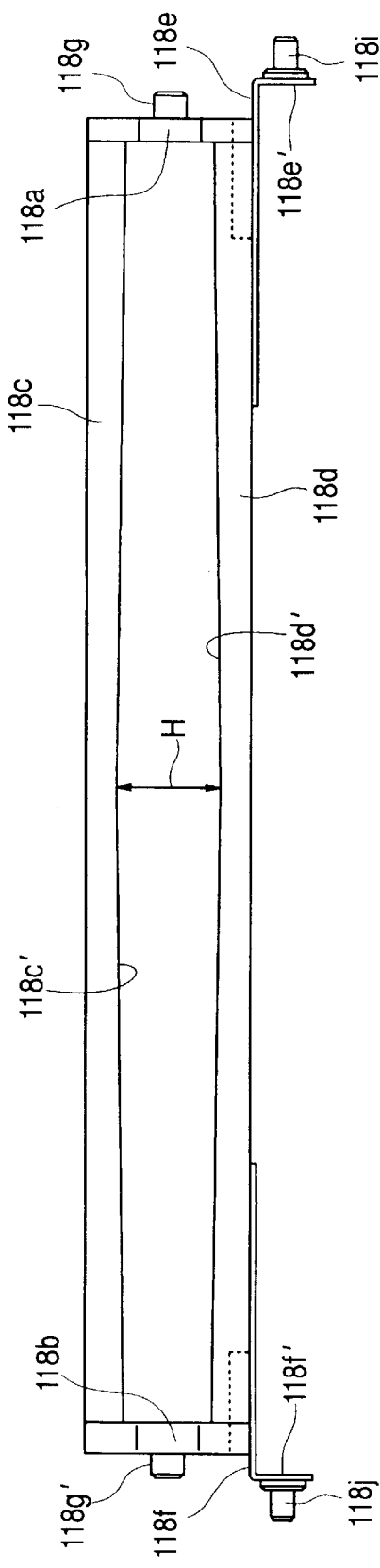
FIG. 21 is a front view showing the pressing member of a disk device according to an embodiment of the present invention.
Figure 22:
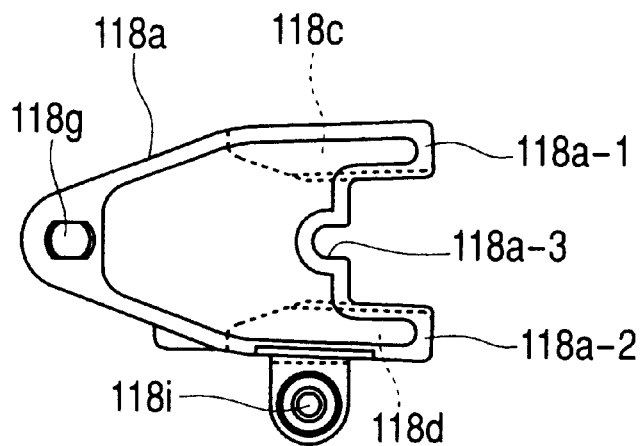
FIG. 22 is a right side view of the pressing member shown in FIG. 20.
Figure 23:
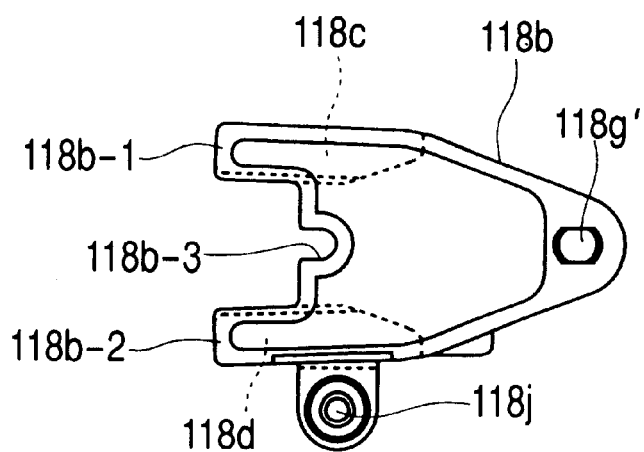
FIG. 23 is a left side view of the pressing member shown in FIG. 20.

FIG. 13 is a plan view showing a driving unit 109; FIG. 14 is a right side view of FIG. 13; FIG. 15 is a left side view of FIG. 13; FIG. 16 is a plan view showing a clamper member 112; FIG. 17 is a front view showing the clamper member 112; FIG. 18 is a sectional view taken on line 18—18 of FIG. 16; FIG. 19 is a right enlarged side view of FIG. 16; FIG. 20 is a plan view showing a pressing member 118; FIG. 21 is a front view showing the pressing member 118; FIG. 22 is a right side view of FIG. 20; and FIG. 23 is a left side view of FIG. 20.

Figure 27:
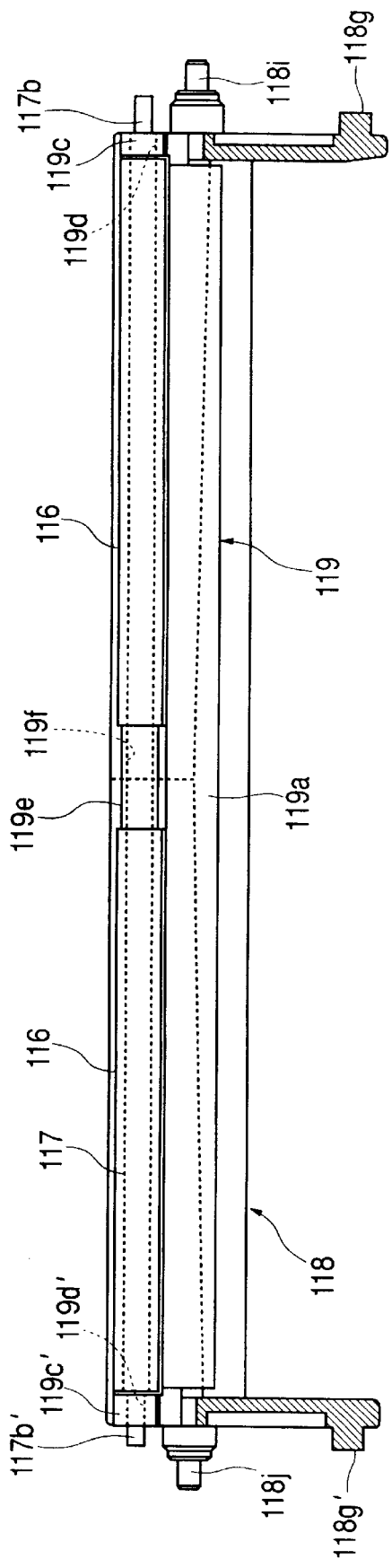
FIG. 27 is a partial sectional plan view showing a combination of a transferring roller, a rotating shaft, a pressing member and a distributing plate in a disk device according to an embodiment of the present invention.
Figure 28:
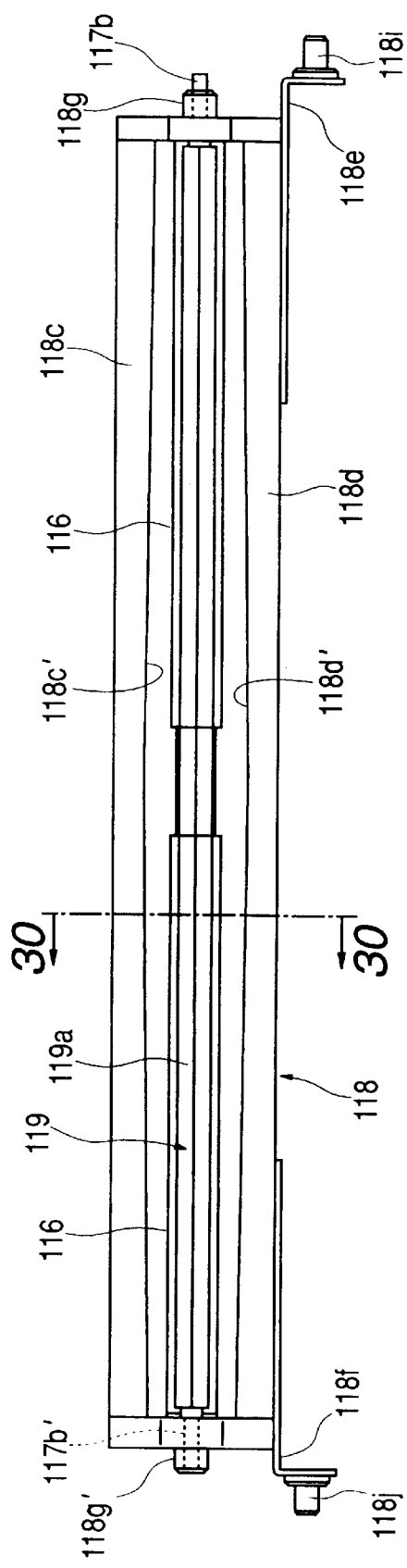
FIG. 28 is a front view showing a combination of a transferring roller, a rotating shaft, a pressing member and a distributing plate in a disk device according to an embodiment of the present invention.
Figure 29:
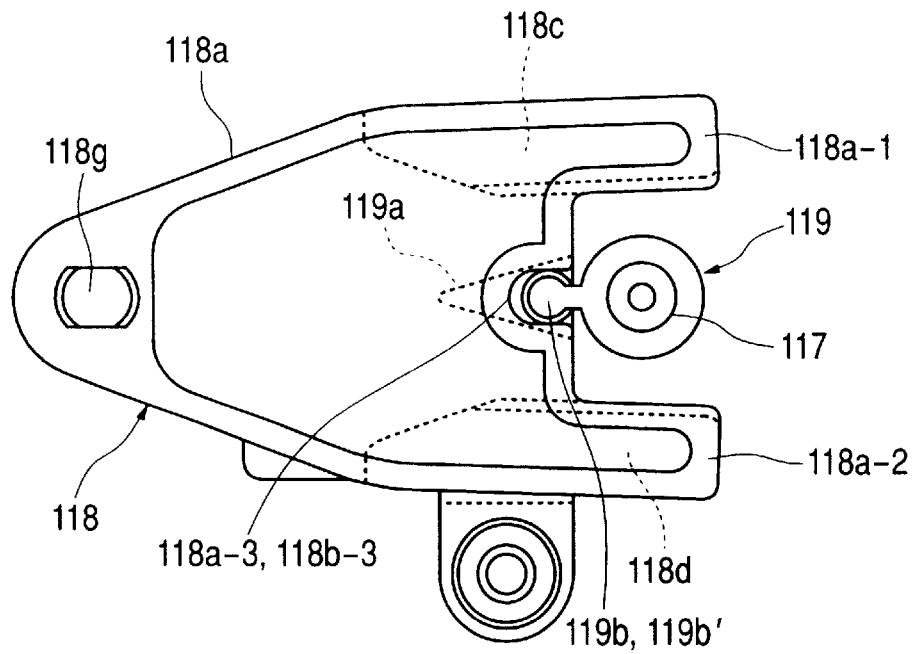
FIG. 29 is a right side view of the components shown in FIG. 27.
Figure 30:
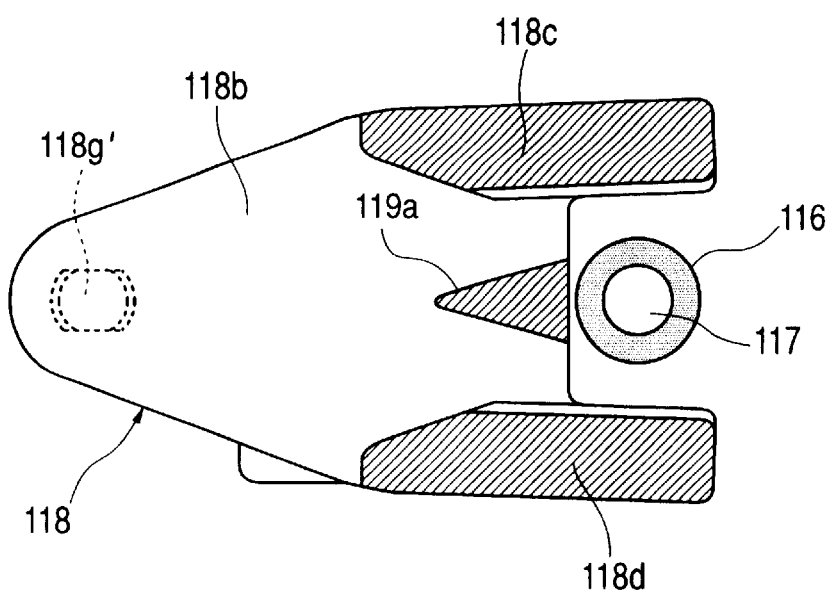
FIG. 30 is a sectional view taken on line XXX—XXX of FIG. 28.

FIG. 24 is a plan view showing a distributing plate 119; FIG. 25 is a right side view of FIG. 24; FIG. 26 is a left side view of FIG. 24; FIG. 27 is a partial sectional plan view showing a combination of a transferring roller 116, a rotating shaft 117, a pressing member 118 and a distributing plate 119; FIG. 28 is a front view showing the combination; FIG. 29 is a right side view of FIG. 27; FIG. 30 is a sectional view taken on line 30—30 of FIG. 28.

Figure 31:
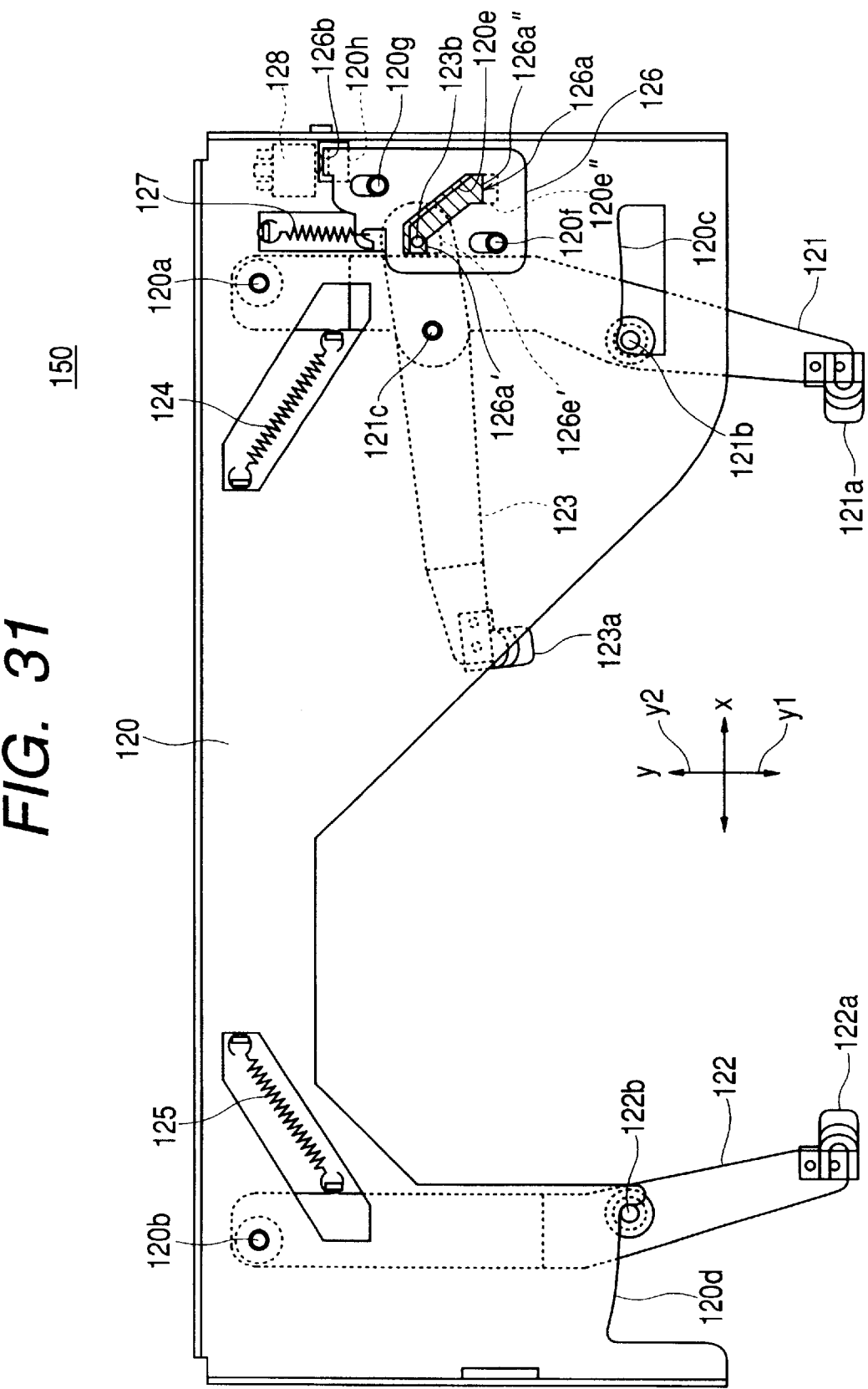
FIG. 31 is a plan view showing lower guide means of a disk device according to an embodiment of the present invention.
Figure 32:
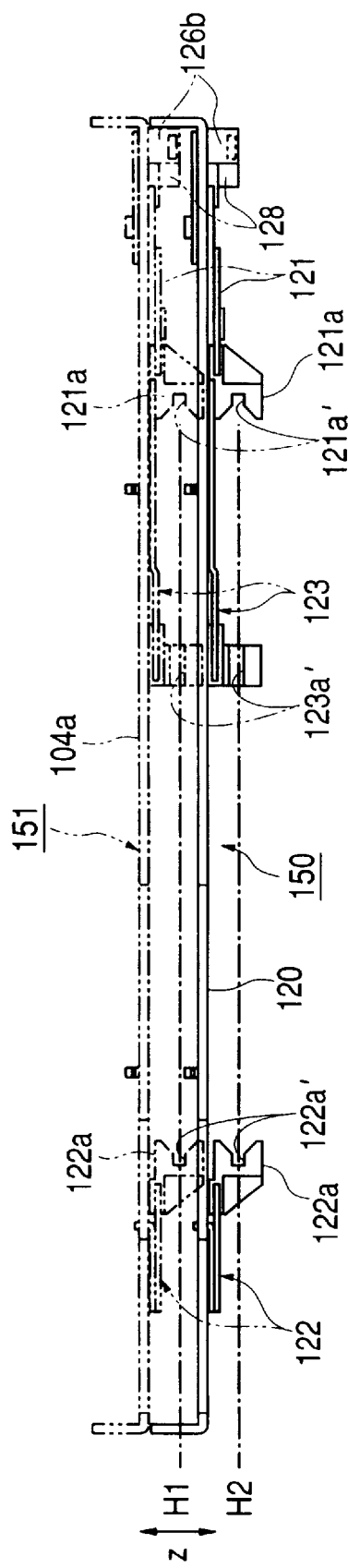
FIG. 32 is a front view showing lower guide means of a disk device according to an embodiment of the present invention.
Figure 33:
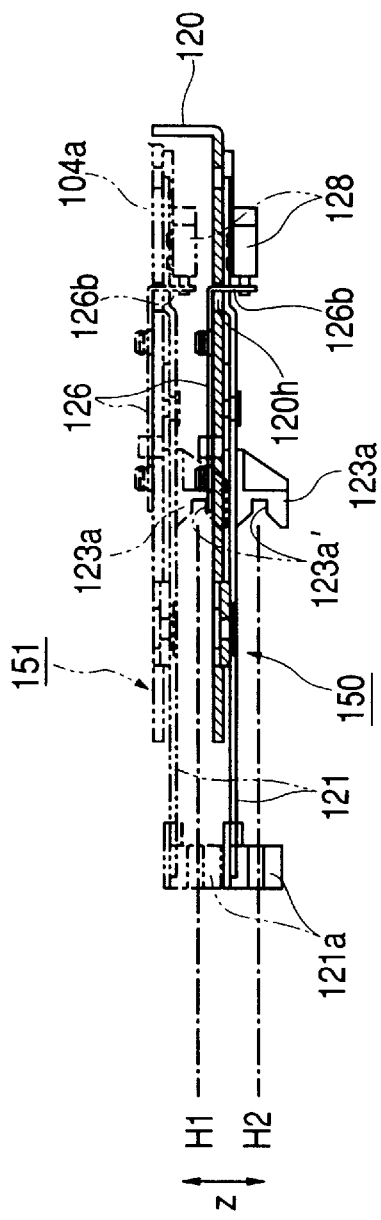
FIG. 33 is a partial sectional right side view of the lower guide means shown in FIG. 31.
Figure 34:
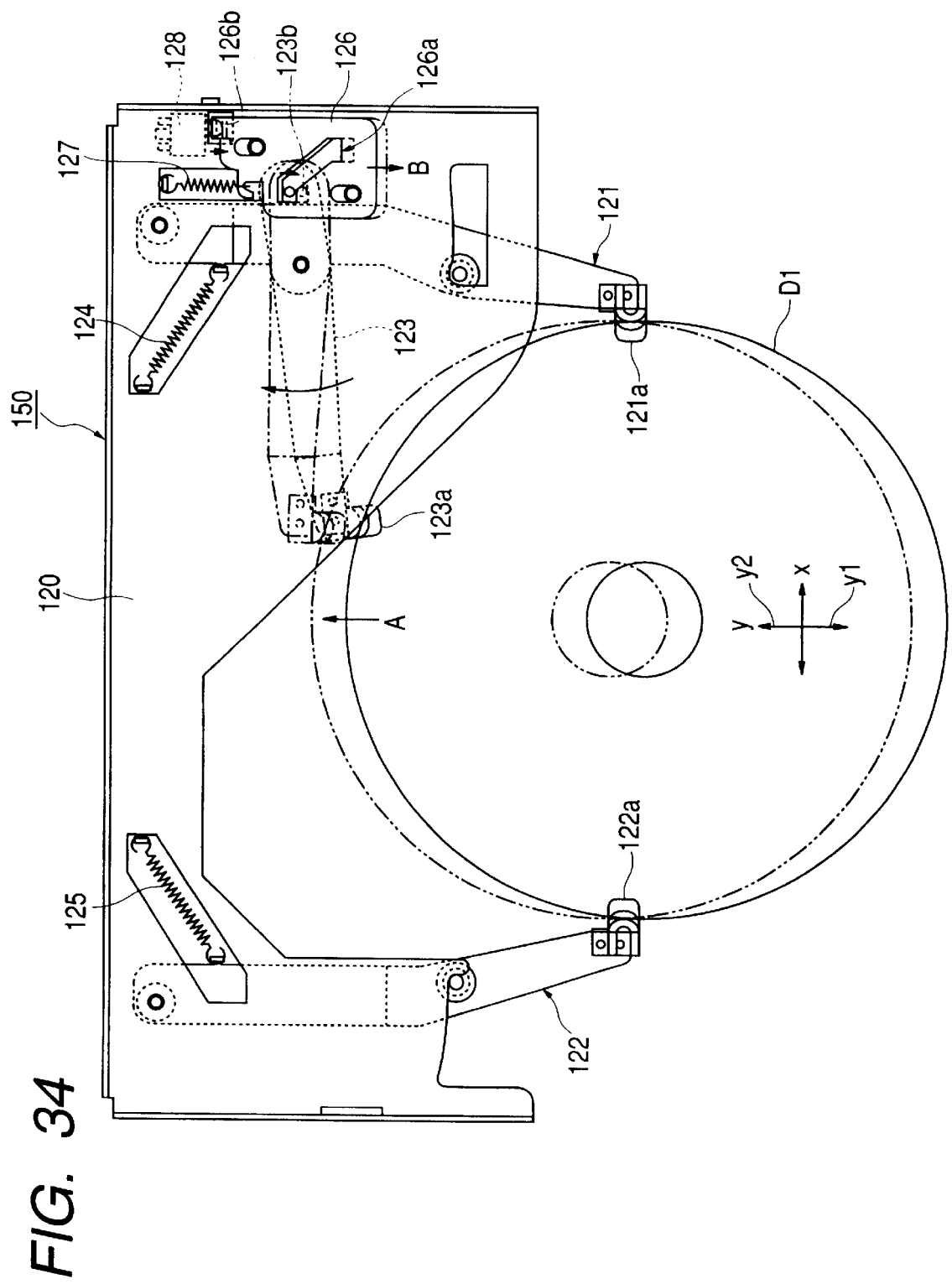
FIG. 34 is an explanatory view for illustrating an operation of lower guide means of a disk device according to an embodiment of the present invention.
Figure 35:
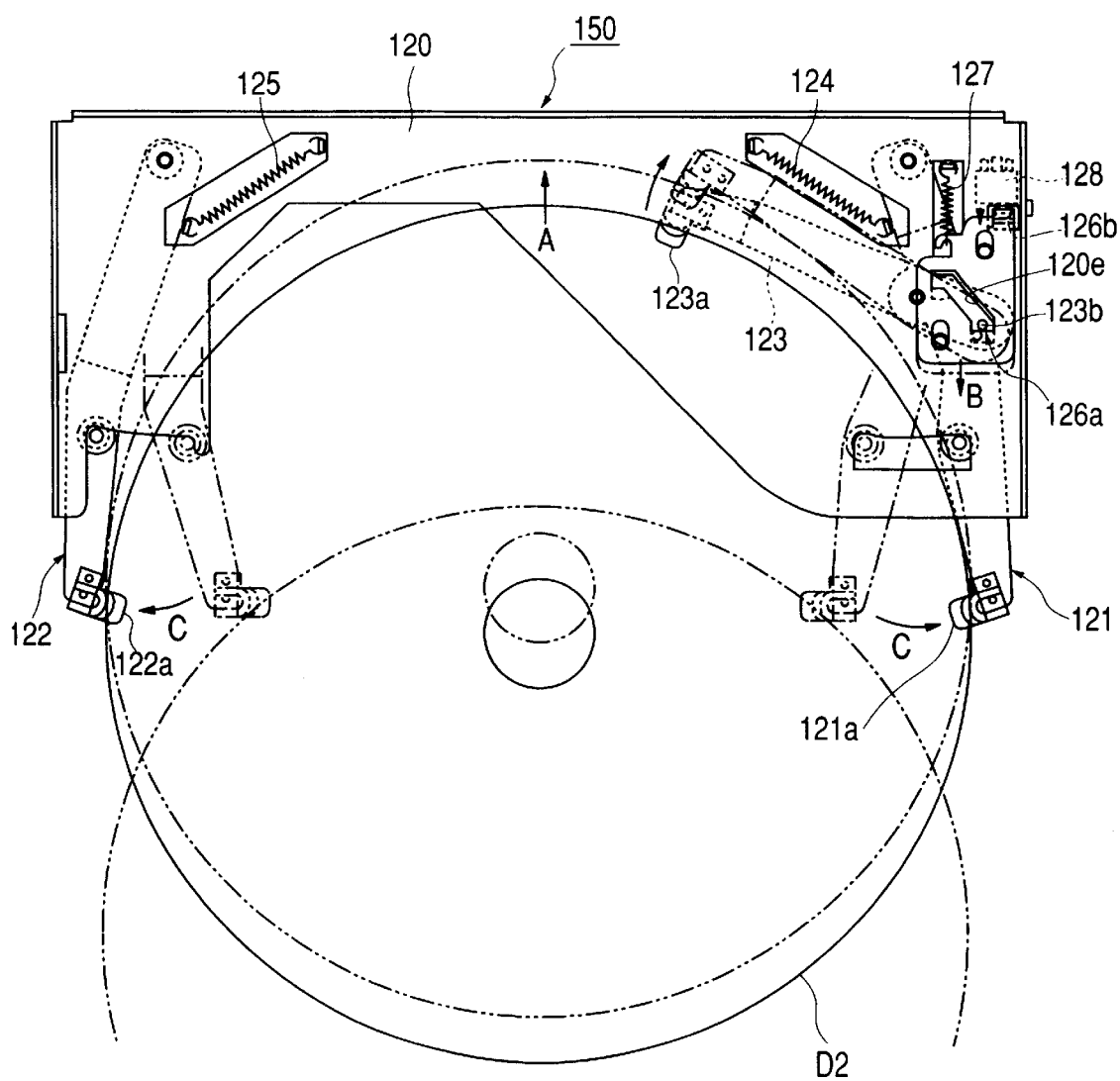
FIG. 35 is an explanatory view for illustrating an operation of lower guide means of the disk device according to an embodiment of the present invention.

FIG. 31 is a plan view showing lower guide means 150; FIG. 32 is a front view showing the lower guide means 150; FIG. 33 is a partial sectional right side view in FIG. 31; FIG. 34 is an explanatory view for illustrating an operation of lower guide means 150; and FIG. 35 is an explanatory view for illustrating an operation of the lower guide means 150.

A disk device 100 shown in FIGS. 1 to 4 is provided with an external case 102 made of metallic plate, and a front panel 103 provided on the front side is formed with an insertion/ejection slot 103a. In other words, this disk device 100 is of a so-called slot-in type, in which a disk D is ejected and inserted through the insertion/ejection slot 103a.

Within the external case 102, there is provided an internal case 104. The internal case 104 is made of metallic plate, and is constructed of a ceiling plate 104a and side plates 104b and 104c (See FIG. 2) obtained by bending the ceiling plate 104a downward from both sides in the x-direction thereof to form so as to oppose to each other, and on the upper surface of the ceiling plate 104a, there is installed a rotating shaft 104j (See FIG. 1).

On the side plate 104b, there are formed a guide groove 104d, a U-shaped groove 104e obtained by cutting off in a U shape, a recessed groove 104f in a height-wise direction (z-direction), respectively as shown in FIG. 3. Also, on the side plate 104c, there are formed U-shaped grooves 104h, 104I, and 104e', and a recessed groove 104f' in a height-wise direction, respectively as shown in FIG. 4.

In this respect, the U-shaped groove 104e and the recessed groove 104f, which have been formed in the side plate 104b, and the U-shaped groove 104e' and the recessed groove 104f', which have been formed in the side plate 104c, are disposed so as to become symmetrical on both sides, respectively. On the external wall surfaces of these side plates 104b and 104c, cam members, that is, movable members 106 and 107 are slidably disposed in a y-direction, respectively.

The movable member 106 is made of metallic plate, and has, as shown in FIGS. 5 to 8, a substantially rectangular plate-shaped portion 106a, a driving transmission unit 106b formed by bending a part of this plate-shaped portion 106a on the y1 side (front panel 103 side), and a driving unit 106c formed by bending a part thereof on the y2 side in the same direction as the driving transmission unit 106b. In the driving transmission unit 106b, an elongated bore 106' having the major axis in the x-direction is formed to penetrate.

At the tip end portion of the driving unit 106c, a rack is formed. Also, in the plate-shaped portion 106a, there are formed two guide grooves 106j and 106j in the y-direction, and cam grooves 106d, 106e and 106f having a respectively predetermined cam configuration are formed, respectively.

The movable member 107 is made of metallic plate, and has, as shown in FIGS. 9 to 12, a substantially rectangular plate-shaped portion 107a, a driving transmission unit 107b formed by bending a part of this plate-shaped portion 107a on the y1 side (front panel 103 side), and a bent piece 107c formed by bending a part of the plate-shaped portion 107a so as to oppose to the driving transmission unit 107b.

In the driving transmission unit 107b, an elongated bore 107' having the major axis in the x-direction is formed to penetrate, and in the central portion of the bent piece 107c, a slit 107c' is formed by cutting off. Also, in the plate-shaped portion 107a, there are formed two guide grooves 107j and 107j in the y-direction, and cam grooves 107e', 107f', 107h and 107i having a respectively predetermined cam configuration are formed, respectively.

These movable members 106 and 107 are slidably supported in the y-direction respectively on the external wall surface of the side plates 104b and 104c (See FIGS. 3 and 4) provided in the internal case 104 along the guide grooves 106j and 106j, and the guide grooves 107j and 107j respectively formed. Also, as shown in FIGS. 3 and 4, the cam grooves 106e and 106f formed in the movable member 106, and the cam grooves 107e' and 107f' formed in the movable member 107 have the same shape respectively, but are disposed in the front-to-back reverse direction each other in the y-direction. Also, the cam groove 106d formed in the movable member 106, and the cam grooves 107h and 107i formed in the movable member 107 have the same shape in the same manner, and are disposed in the front-to-back reverse direction.

A driving gear (not shown) to be rotationally driven by a driving motor (not shown) provided within the disk device 100 engages with a rack in a driving unit 106c of the movable member 106 such that the movable member 106 is driven in the front-to-back (y) direction.

As shown in FIG. 4, within the movable member 107 in the lower part of the internal case 104 on the front panel 103 side, there are provided four transparent optical detection switches SW1, SW2, SW3 and SW4 at predetermined intervals side by side, and the bent piece 107c of the movable member 107 is inserted in non-contact in clearance, which is a light transmission portion of each of the optical detection switches SW1 to SW4. In this respect, when the light transmission portion is intercepted, each light detection switch SW1 to SW4 is set to be turned off.

On the other hand, as shown in FIG. 1, on a ceiling plate 104a of the internal case 104, an arm-shaped arm member 108 is disposed, the central part of which is pivotally supported by a rotating shaft 104j. Also, at both ends of the arm member 108, driving pins 108a and 108a are installed upwardly, respectively.

These driving pins 108a and 108a of the arm member 108 are pivotally fitted in the elongated bores 106b' and 107' formed in the movable members 106 and 107, and slidably along the direction of the major axis of the elongated bore. Thus, when the movable member 106 is driven in the y-direction by the driving motor, the driving transmission unit 106b of the movable member 106 rotates the arm member 108 to transmit the driving to the driving transmission unit 107b of the movable member 107, which has been arranged on the opposite side to the driving transmission unit 106b so that the movable member 107 can be slidably driven in they-direction. In this respect, as seen from the figure, the movable members 106 and 107 are driven in the opposite direction to each other when slidably driven.

The driving unit 109 is, as shown in FIGS. 13 to 15, constructed of a chassis portion 110 and a recording/reproducing unit 111 placed and mount-fixed on this chassis portion 110. The chassis 110 is formed by bending a metallic plate, and is provided with side plates 110a and 110b caused to oppose so as to become parallel with each other. The side plate 10b is formed to have length longer in the y-direction than the side plate 110a, and on the outer wall surface of the side plate 110b, moving pins 110h and 110i are installed. Further, a moving pin 110d is installed on the outer wall surface of the side plate 110a.

Also, the recording/reproducing unit 111 is provided with a spindle motor (not shown), and a turntable Ta is fixed to a revolving shaft thereof. Also, on the recording/reproducing unit 111, a pickup (not shown) is arranged so as to oppose to the recording/reproducing surface of a disk D so that recording on or reproduction from the disk can be performed.

The clamper member 112 is, as shown in FIGS. 16 to 19, constructed of a clamper chassis 113 having a longitudinal shape in the x-direction and a clamper 114. The clamp chassis 113 is formed by bending a metallic plate, and is provided with side plates 113a and 113b on its both sides, which are caused to oppose so as to become parallel with each other. Also, on the outer wall surfaces of the side plates 113a and 113b, two each of moving pins 113e and 113e, and 113e' and 113e' are installed side by side in the z-direction. Also, in the central portion of the clamp chassis 113, the clamper 114 is rotatably provided.

As shown in FIG. 3, the moving pin 110d provided in the chassis portion 110 of the driving unit 109 is inserted into the guide groove 104d, and is also inserted into the cam groove 106d, and is made movable within these guide groove 104d and cam groove 106d. Similarly, as shown in FIG. 4, the moving pins 110h and 110i provided in the chassis portion 110 are inserted into the U-shaped grooves 104h and 104i respectively, and are also inserted into the cam grooves 107*h* and 107*i* respectively, and are made movable within these U-shaped grooves 104*h*, 104*i* and cam grooves 107*h* and 107*i*. In this manner, the driving unit 109 is disposed within the internal case 104.

Also, as shown in FIG. 3, the moving pins 113*e* and 113*e* provided in the clamp chassis 113 of the clamper member 112 are inserted into the U-shaped groove 104*e*, and the upper moving pin 113*e* is also inserted into the cam groove 106*e*, and are made movable within these U-shaped groove 104*e* and cam groove 106*e*. Similarly, as shown in FIG. 4, the moving pins 113*e*' and 113*e*' provided in the chassis portion 110 are inserted into the U-shaped groove 104*e*', and the upper moving pin 113*e*' is also inserted into the cam groove 107*e*', and are made movable within these U-shaped groove 104*e*' and cam groove 107*e*'. In this manner, the clamper member 112 is disposed within the internal case 104.

The transferring means 115 is, as shown in FIG. 1, constructed of: transferring rollers 116 and 116; a rotating shaft 117 having small-diameter shafts 117*b* and 117*b* at both ends thereof respectively; a transferring motor (not shown) for rotationally driving this rotating shaft 117 to rotate the transferring roller 116 in clockwise direction or in counterclockwise direction; a pressing member 118; and a distributing plate 119.

The pressing member 118 is, as shown in FIGS. 20 to 23, constructed of: substantially U-shaped side plates 118*a* and 118*b*, which are opposed to each other; two pressing plates 118*c* and 118*d* provided up and down so as to bridge over these two side plates 118*a* and 118*b*; and supporting plates 118*e* and 118*f* installed and fixed to the under surface of the lower pressing plate 118*d*, and provided so as to protrude on both sides, respectively. In this respect, the side plates 118*a* and 118*b* and the pressing plates 118*c* and 118*d* are made of resin, and formed by integral molding.

The side plate 118*a* has a pair of arm portions 118*a*-1 and 118*a*-2 at an end portion, and on the inner base of a concave portion interposed between those arm portions 118*a*-1 and 118*a*-2, there is provided an U-shaped cut-off portion 118*a*-3. Also, on the outer wall surface of the other end portion of the side plate 118*a*, there is installed a turning shaft 118*g*. Similarly, on the side plate 118*b*, there are provided arm portions 118*b*-1 and 118*b*-2, a cut-off portion 118*b*-3 and a turning shaft 118*g*'.

The pressing plate 118*c* is provided with respective arm portions 118*a*-1 and 118*b*-1 of the both side plates 118*a* and 118*b* bridged to each other. Similarly, the pressing plate 118*d* is provided with respective arm portions 118*a*-2 and 118*b*-2 of the both side plates 118*a* and 118*b* bridged to each other. In other words, these two pressing plates 118*c* and 118*d* are disposed so as to oppose to each other with clearance interposed therebetween. Also, as shown in FIG. 21, on the opposite surfaces of each pressing plate 118*c* and 118*d*, there are formed pressing surfaces 118*c*' and 118*d*', which are gently-sloping concave surfaces formed in such a manner that its interval H becomes wider toward the central portion, respectively.

Also, the supporting plates 118*e* and 118*f* are made of metallic plates having spring property, bent pieces 118*e*' and 118*f*' obtained by bending in a L-character shape are formed as shown in FIG. 21, and on their outer wall surfaces, there are installed moving pins 118*i* and 118*j*, respectively. The respective tip end portions of the supporting plates 118*e* and 118*f* on the moving pins 118*i* and 118*j* side are capable of performing elastic displacement vertically in FIG. 21.

The distributing plate 119 is formed by integral molding using resin, and is, as shown in FIGS. 24 to 26, constructed of: a division unit 119*a* having a wedge-shaped section; engaging shafts 119*b* and 119*b*' formed projectingly from both end surfaces of the division unit 119*a*; cylindrical supporting portions 119*c* and 119*c*' provided contiguously to the engaging shafts 119*b* and 119*b*' on the opposite side to the division unit 119*a* respectively; and a supporting portion 119*e* provided coaxially to the supporting portions 119*c* and 119*c*' at the central portion of the division unit 119*a*. Also, the supporting portions 119*c* and 119*e* are formed with through-holes 119*d* and 119*f* with a large diameter, and the supporting portion 119*c*' is formed with a through-hole 119*d*' with a fine diameter coaxially, respectively.

As shown in FIGS. 27 to 30, between the supporting portions 119*e* and 119*c* of the division member 119, and between the supporting portions 119*e* and 119*c*', transferring rollers 116 and 116 are disposed respectively, a rotating shaft 117 is inserted through so as to penetrate the through-holes 119*d* and 119*f* in the supporting portions 119*c* and 119*e* and the central portions of the transferring rollers 116 and 116. Also, the fine-diameter shaft 117*b*' is inserted into the through-hole 119*d*' in the supporting portion 119*c*', whereby the transferring rollers 116 and 116 are rotatably assembled to the division member 119.

This assembly is, as shown in FIGS. 1, 3 and 4, disposed within the internal case 104 with small-diameter shafts 117*b* and 117*b*' rotatively fitted respectively in round holes 200*a* and 201*a* in the supporting members 200 and 201 provided on both sides of the internal case 104. At this time, the transferring roller 116 is, as shown in FIG. 3, disposed between a first driving position H1 and a second position H2 (described later) in the z-direction. On the upper side of the transferring roller 116, an upper transferring path is formed, and on the lower side thereof, a lower transferring path is formed, and on the upper and lower transferring paths, the upper roller portion and the lower roller portion of the transferring roller 116 are facing, respectively.

Also, the rotating shaft 118*g* is axially supported in a round hole 200*b* formed in the supporting member 200, the moving pin 118*i* is inserted into a cut-off portion 104*f* in the side plate 104*b*, is also inserted into a cam groove 106*f* in the movable member 106, and the rotating shaft 118*g*' is axially supported in a round hole 201*b* formed in the supporting member 201, the moving pin 118*j* is inserted into the cutoff portion 104*f*' in the side plate 104*c*, and is also inserted into the cam groove 107*f*' in the movable member 107, whereby the pressing plate 118*c* is disposed within the internal case 104.

At this time, as shown in FIG. 29, engaging shafts 119*b* and 119*b*' in the division member 119 are adapted to be pivotally engaged respectively with cut-off portions 118*a*-3 and 118*b*-3 provided in the side plates 118*a* and 118*b* of the pressing member 118, respectively.

Disk guide means has lower guide means 150 to be structured on a sub-chassis 120 (See FIGS. 1 and 3) mounted and fixed in the rear portion of the internal case 104, and upper guide means 151 to be structured on the ceiling plate 104*a* of the internal case 104 above the sub-chassis 120.

The lower guide means 150 is, as shown in FIGS. 31 to 33, disposed on the under surface side of the sub-chassis 120, and is constructed of guide arms 121, 122 and 123, each having an arm-shaped portion made of metallic plate. The guide arms 121 and 122 are disposed on both sides of the sub-chassis 120 in the x-direction so as to oppose to each other, and one end portion of each thereof is axially supported by each of rotating shafts 120a and 120b installed on the under surface side of the sub-chassis 120 respectively to be made freely rotatable.

Also, at the other end portions of the guide arms 121 and 122, disk guide portions 121a and 122a made of resin are provided integrally thereto. On these disk guide portions 121a and 122a, ⊐-character-shaped concave grooves 121a' and 122a' are formed to oppose to each other as shown in FIG. 32, and further there are formed inclined portions, which are enlarged from the concave grooves 121a' and 122a' toward openings.

Further, on the guide arms 121 and 122, locking shafts 121b and 122b are installed on the upper surface between the rotating shaft 120a, 120b and the disk guide portion 121a, 122a, respectively. Also, between the rotating shaft 120a and the locking shaft 121b, there is installed a rotating shaft 121c on the upper surface.

Also, the guide arm 121, 122 is elastically biased on the opposite side (inwardly) respectively by a coiled spring 124, 125. The locking shaft 121b, 122b abuts upon the inside edge portion of a regulating groove 120c, 120d formed by cutting off the sub-chassis 120 respectively, whereby the position of the guide arm 121, 122 in the inner side is adapted to be regulated.

On the other hand, the guide arm 123 has, at its tip end portion, a disk guide portion 123a having a concave groove 123a' having a similar shape to the guide arm 121, 122. Also, on the end portion on the opposite side to the disk guide portion 123a, there is installed a moving pin 123b on the upper surface.

The guide arm 123 structured in such a manner is axially supported by a turning shaft 121c provided on the guide arm 121 between the disk guide portion 123a and the moving pin 123b to be capable of freely turning. Also, the moving pin 123b of the guide arm 123 is movably inserted into a guide groove 120e formed in a rightward inclined shape on the sub-chassis 120. In this respect, at both end portions of this guide groove 120e, loosely-fitted portions 120e', 120e", in which the moving pin 123b can be loosely fitted, are formed on the upper and lower sides, respectively.

The disk guide portions 121a, 122a and 123a provided in the guide arms 121, 122 and 123 described above respectively are, as shown in FIGS. 32 and 33, arranged at the same height in the height-wise direction (z-direction) of the disk device 100. A concave groove 121a' to 123a' formed in each disk guide portion 121a to 123a is also arranged at the same height, and the outer peripheral edge portion of the disk D (D1 or D2) is caught from outside by these disk guide portions as shown in FIGS. 34 and 35, whereby the disk D is adapted to be held by the guide arms 121 to 123. In this case, a holding position of the disk D to be guided by the lower guide means 150 in the z-direction is assumed to be a second driving position H2, and that in the upper guide means 151 is assumed to be a first driving position H1 (See FIGS. 32 and 33).

On the other hand, so as to cover the guide groove 120e shown in FIG. 31, on the upper surface of the sub-chassis 120, a slide member 126 is provided slidably along pins 120f and 120g installed on the upper surface of the sub-chassis 120 in the y-direction. Also, the slide member 126 is elastically biased on the y2 side by a coiled spring 127.

Also, the slide member 126 is provided with an engaging groove 126a (hatched portion) formed at a position substantially overlapping with the guide groove 120e, and a pressing unit 126b formed by bending one part of the slide member 126 into a L-character shape. In the engaging groove 126a, there is inserted through a moving pin 123b of the guide arm 123 which inserts into the guide groove 120e and protrudes, and at both end portions of the engaging groove 126a, there are formed regulating surfaces 126a" and 126a" for regulating movement of the moving pin 123b toward the front (y1 direction), respectively. Also, the pressing unit 126b is arranged so as to inert into a through-hole 120h formed in the sub-chassis 120 and protrude on the under surface side (See FIG. 33).

Also, so as to oppose to the pressing unit 126b, a detection switch 128 is installed and fixed to the under surface of the sub-chassis 120. In the state shown in FIGS. 31 to 33, the pressing unit 126b is in a state in which the lever of this detection switch 128 is depressed to turn on the switch.

FIGS. 34 and 35 show a state in which a small-diameter type disk D (D1) having an outside diameter of, for example, 8 cm and a disk D (D2) having an outside diameter of 12 cm are guided and held by the guide arms 121 to 123 of the lower guide means 150, respectively.

First, when the small-diameter type disk D1 is fed from the front (front panel 103 side) of the lower guide means 150 by the transferring means 115 (See FIG. 1), the disk D1 is fed until it abuts upon the disk guide portion 123a, while both sides of the disk D1 are being guided by the disk guide portions 121a and 122a, which are opposed to each other, in the state shown in FIG. 31.

Thus, After the tip end portion of the disk D1 abuts upon the disk guide portion 123a of the guide arm 123 as shown in FIG. 34, the disk guide portion 123a is further pressed in an A-direction in the figure, whereby the guide arm 123 rotates in clockwise direction, the moving pin 123b on the opposite side to the disk guide portion 123a abuts upon a regulating surface 126a' (See FIG. 31) formed on the engaging groove 126a of the slide member 126 to press in the y1 direction against the elastic force of the coiled spring 127. At this time, the slide member 126 moves in a B-direction in the figure so that the pressing unit 126b retracts from the detection switch 128 to turn OFF the detection switch. Thus, the lower guide means 150 detects that the disk D1 has been completely transferred.

Next, when the disk D2 is fed from the front (front panel 103 side) of the lower guide means 150, the tip end portion of the disk D2 abuts upon the disk guide portions 121a and 122a which are opposed to each other in the state shown in FIG. 31. Thus, the guide arms 121 and 122 rotate so as to open in an arrow C direction in FIG. 35 respectively against the elastic force of the coiled springs 124 and 125.

At the same time, the guide arm 123 axially supported by the guide arm 121 moves in the direction of rotation together with the guide arm 121. At this time, the moving pin 123b provided in the guide arm 123 moves along the guide groove 120e formed in the sub-chassis 120 to be located in the loosely-fitted portion 120e" (see FIG. 31).

Thereafter, the disk D2 is further fed into the interior while both sides of the disk D2 are being guided by the disk guide portions 121a and 122a. After the tip end portion of the disk D2 abuts upon the disk guide portion 123a of the guide arm 123 as shown in FIG. 35, the disk guide portion 123a is further pressed in the A-direction in the figure, whereby the moving pin 123b on the opposite side to the disk guide portion 123a abuts upon a regulating surface 126a" (See FIG. 31) formed in the engaging groove 126a in the slide member 126 to press in the y1 direction against the elastic force of the coiled spring 127.

At this time, the slide member 126 moves in the B-direction in the figure so that the pressing unit 126b retracts from the detection switch 128 to turn OFF the detection switch. In this manner, the lower guide means 150 is capable of detecting that the disk D2 has been completely transferred.

As described above, according to the present embodiment, the disk D2 of an ordinary size (such as CD and DVD having an outer diameter of, for example, 12 cm) and the small-diameter disk D1 (such as CD having an outer diameter of, for example, 8 cm) are adapted to be able to be both simply held by the guide means. The operation of holding such a disk D is applicable to upper guide means 151 to be described later.

Next, the upper guide means 151 has the same structure as the above-described lower guide means 150, and is, as shown in FIGS. 32 and 33, disposed on the ceiling plate 104a, and is arranged in such a manner as to overlap with each component of the lower guide means 150 at predetermined intervals in an up-and-down direction.

In this respect, in order to avoid duplication, description of the upper guide means 151 will be omitted. In this respect, as regards each component of the upper guide means 151, components identical to those in the lower guide means 150 are designated by the identical reference numerals.

Feeding means is provided in the vicinity of the disk device 100 on the front panel 103 side, and is, as shown in FIGS. 1 to 3, constructed of a feeding roller 160; a pressing plate 161; a supporting pedestal 165; and a transferring motor (not shown) for rotating the feeding roller 160 in clockwise direction or in counterclockwise direction. Also, the feeding roller 160 is provided with rotating shafts 160a and 160b formed projectingly from both end surfaces respectively, which are rotatably pivoted in round holes 200c and 201c formed in the supporting members 200 and 201 respectively as shown in FIG. 1.

On the outer wall portions of the supporting members 200 and 201, there are provided biasing members 162 and 162 (See FIG. 1) each consisting of a torsional coiled spring to elastically bias the feeding roller 160 upwardly (z1 direction)

Also, as shown in FIGS. 1 and 3, a reflection type optical detection switch 163 is provided on the supporting pedestal 165 located under the insertion/ejection slot 103a in the vicinity of the front panel 103 so as to be exposed on the upper side. Also, on the other side of the optical detection switch 163, there is similarly provided a reflection-type optical detection switch 164 with the feeding roller 160 interposed therebetween.

The description will be made of operations of each member in the disk device 100 structured as described above and an exchange operation of disks D.

FIGS. 36 to 40 are all explanatory views for illustrating an exchange operation of disks.

In this respect, in the present embodiment, a case where a disk D (D2) of an ordinary size is used as a disk D will be described.

First, the description will be made of a case where the disk D2 (-1) is reproduced in a first driving position H1 (See FIGS. 32 and 33) in the upper guide means 151.

Figure 36:
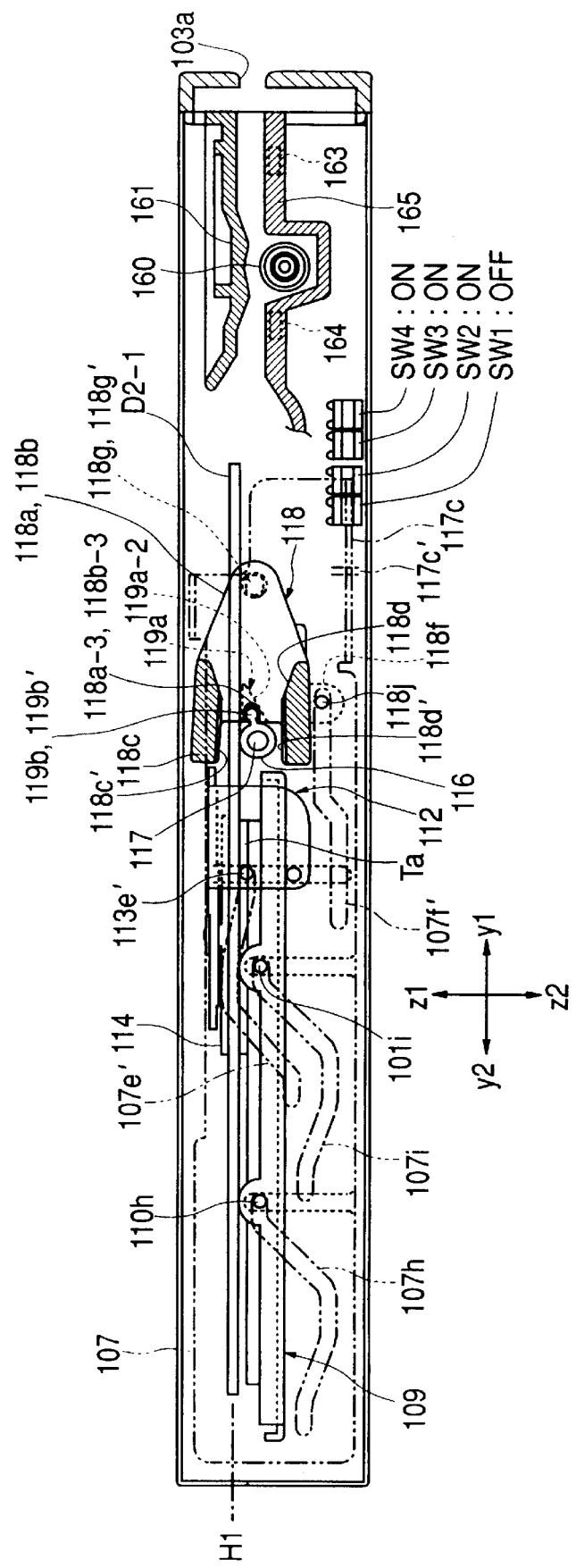
FIG. 36 is an explanatory view for illustrating an exchange operation of disks in the disk device according to an embodiment of the present invention.

FIG. 36 shows that the movable member 107 (106) has moved extremely in the y2 (y1) direction, and that the driving unit 109 is at the highest position on the z1 side. Also, the upper moving pin 113e' (113e) of the clamper member 112 relatively lowers on an inclined portion of the cam groove 107e' (106e) in the y1 (y2) direction from the state of FIG. 4 and is moved to a position whereat the clamper member 112 has reached a horizontal portion of the inclined portion on the lower portion side (first position).

A disk D2-1 is in a clamped state, sandwiched between a turntable Ta and a clamper 114, the disk D2-1 is rotationally driven by a spindle motor, and a reproduction operation is performed by a pickup. At this time, respective disk guide portions 121a to 123a of the guide arms 121 to 123 shown in FIG. 35 are driven by a mechanism (not shown) so as to retract from the outer peripheral edge portion of the disk D2-1, and do not interfere with the disk D2-1. This is applicable to the lower guide means 150.

In this respect, the bent piece 107c of the movable member 107 is moved to a predetermined position with movement of the movable member 107, and edge portions of the bent piece 107c on both sides and a slit 107c' turn the optical detection switches SW1 to SW4 ON or OFF, whereby the predetermined positions are adapted to be able to be detected. Thus, at the first position, the optical detection switches SW1 to SW4 detect OFF, ON, ON and ON states respectively, whereby the movement of the movable member 107 (106) is adapted to be stopped.

A moving pin 118j (118i) of the pressing member 118 is caused to move from the state of FIG. 4 to a position whereat it goes up the inclined portion of the cam groove 107f (106f) in the y1 (y2) direction to reach a horizontal portion on the upper portion side. At this time, the side plate 118a, 118b of the pressing member 118 is adapted to rotate by a predetermined angle in clockwise direction in FIG. 36 around the turning shaft 118g, 118g' from the state of FIG. 4 for pivoting and moving the pressing plate 118c, 118d upward.

Accordingly, in this state, clearance between a pressing surface 118d' of the pressing plate 118d and the lower roller portion of the transferring roller 116 becomes narrower than the state of FIG. 4, and conversely, clearance between a pressing surface 118c' of the pressing plate 118c and the upper roller portion of the transferring roller 116 becomes wider.

With the rotation of the side plate 118a (118b), the engaging shaft 119b (119b') of the distributing plate 119 for engaging with the cut-off portion 118a-3 (118b-3) of the side plate 118a (118b) is pressed upwardly, whereby the division unit 119a rotates, from the state of FIG. 4, by a predetermined angle around the rotating shaft 117 in counterclockwise direction in FIG. 36 to pivot and move upward (state of a second rotation position). In this state, the under surface 119a-2 of the division unit 119a is an inclined surface obliquely opposing to the insertion/ejection slot 103a.

At the first position shown in FIG. 36, the disk D2-1 is disposed in wide clearance between the pressing surface 118c' and the upper roller portion of the transferring roller 116. In this respect, during reproduction, the disk D2-1 is adapted to be held on the turn table Ta surface without coming into contact with the pressing surface 118c' and the transferring roller 116.

When a new disk D2-2 (See FIG. 37) is inserted into the insertion/ejection slot 103a at the first position, it is detected by the detection switch 163, and the rotation of the spindle motor is stopped to stop the disk reproduction operation.

Figure 37:
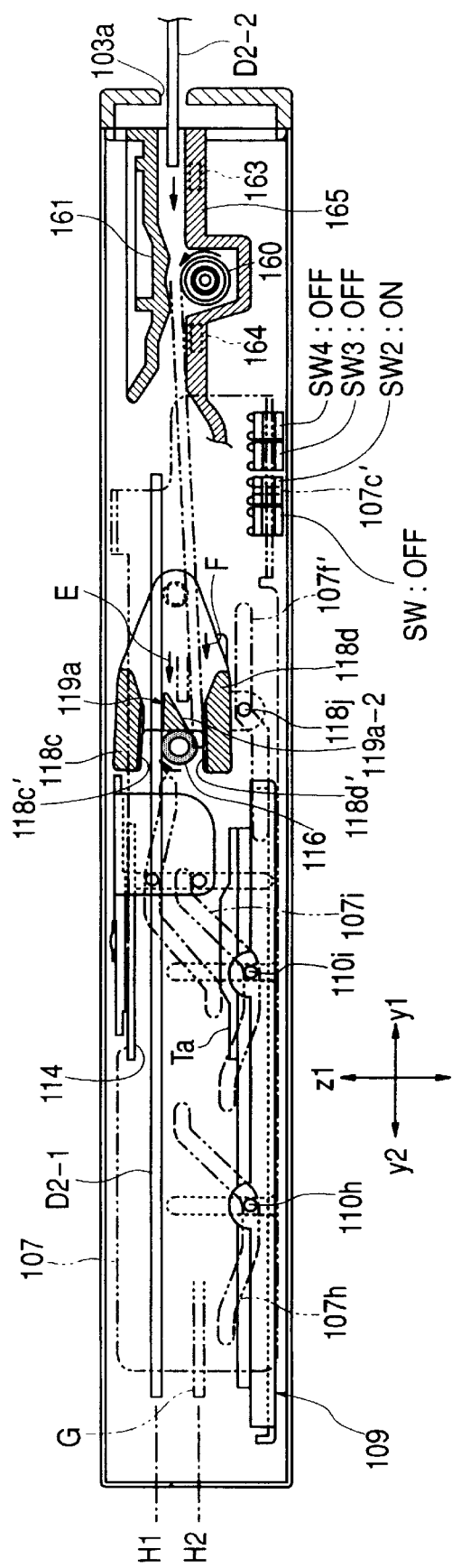
FIG. 37 is an explanatory view for illustrating an exchange operation of disks in the disk device according to an embodiment of the present invention.

At the same time, the driving motor (not shown) is started, whereby the movable member 107 is moved in the y1 direction. When the movable member 107 moves in the y1 direction shown as shown in FIG. 37, the upper moving pin 113e' of the clamp member 112 goes up from the horizontal portion of the cam groove 107e' on the inclined portion in the y2 direction, and moves to the horizontal portion at the highest position to cause the clamp member 112 to ascend in the z2 direction.

Also, the moving pin 110*h*, 110*i* of the driving unit 109 descends on the inclined portion in the y2 direction from the horizontal portion of the cam groove 107*h*, 107I, and moves to the horizontal portion at the lowest portion to cause the driving unit 109 to descend in the z2 direction.

Accordingly, the clamp member 112 and the driving unit 109 are spaced apart from both surfaces of the disk D2-1 respectively in such a manner that they are spaced apart from each other, and the disk D2-1 becomes unclamped (second position).

In this respect, at the second position, the optical detection switches SW1 to SW4 detect OFF, ON, OFF and OFF states respectively, whereby the movable member 107 is adapted to be able to stop its movement.

Also, at the second position, the moving pin 118*j* of the pressing member 118 only moves the horizontal portion of the cam groove 107*f*' at the same height as shown in FIG. 36, and the pressing member 118 maintains the state of the first position shown in FIG. 36.

When the disk D2-2 is detected, a transferring motor (not shown) is started so that a feeding roller 160 is rotated in counterclockwise direction, which is the direction that draws the disk D2-2 into the disk device 100 (See FIG. 37). The disk D2-2 is manually inserted in a horizontal posture with a supporting pedestal 165 provided before and after the feeding roller 160 as a guide.

Thus, the tip end of the disk D2-2 on the y2 side enters the upper part side of the feeding roller 160, whereby it is sandwiched between the feeding roller 160 and the pressing plate 161, and is transferred into the interior of the disk device 100, which is the y2 side shown, by a feeding force of the feeding roller 160.

The disk D2-2 to be transferred with its horizontal posture maintained abuts upon the under surface 119*a*-2 of the division unit 119*a* in the distributing plate 119 as indicated by an arrow E in FIG. 37, and thereafter, slidably moves along this under surface 119*a*-2 to change over the direction of the disk D2-2 in a downward direction. In this manner, a transfer mechanism for changing over the direction of the disk is mainly constructed of a distributing plate 119. Thus, as indicated by an arrow F in the figure, the disk D2-2 enters the lower part side of the transferring roller 116. When the disk D2-2 is detected, this transferring roller 116 is rotated in clockwise direction, which is a direction that draws the disk D2-2 into the disk device 100.

The disk D2-2 is sandwiched between the lower roller portion of the transferring roller 116 and the pressing surface 118*d*' of the pressing plate 118*d*, and the feeding force of the transferring roller 116 further transfers it into the interior of the disk device 100, which is the y2 side shown, through the lower transferring path. At this time, since the disk D2-2 is, as shown in FIG. 28, pressed by a pressing surface 118*d*' formed on the pressing plate 118*d* in a concave shape, the pressing surface 118*d*' mainly presses both edge portions of the disk D2-2, and accordingly, the central portion of the pressing surface 118*d*' does not come into contact with the recording and reproducing surface of the disk D2-2, but the disk D surface is adapted to be able to be prevented from being damaged due to the feeding of the disk D2-2.

Also, the pressing member 118 is structured such that a moving pin 118I, 118*j* coupled thereto with a supporting plate 118*e*, 118*f* (See FIG. 28) having spring resiliency interposed therebetween engages with a cam groove 106*f*, 107*f*' of the movable member 106, 107, and when the disk D2-2 is pressed against the transferring roller 116 by the pressing surface 118*d*', an adequate elastic force is adapted to be given.

Further, the tip end of the disk D2-2 fed into the interior by the transferring roller 116 enters the concave groove 121*a*', 122*a*' (See FIG. 32) in the disk guide portion 121*a*, 122*a* shown in FIG. 35, whereby the disk D2-2 is caught within the lower guide means 150, and is transferred into the interior while being guided by the guide portion 121*a*, 122*a*.

When the disk D2-2 is further driven for feeding by the transferring roller 116, the tip end side of the disk D22 enters the concave groove 123*a*' (See FIG. 33) in the disk guide portion 123*a* of the guide arm 123 as shown in FIG. 35 for pressing, whereby the detection switch 128 turns OFF, and it is detected that the disk D2-2 has been completely set in the lower guide means 150 (state of G in FIG. 37).

When an OFF signal from the detection switch 128 is detected, the driving motor is started, whereby the movable member 107 is moved in the y1 direction. When the movable member 107 moves in the y1 direction shown as shown in FIG. 38, the moving pin 118*j* of the pressing member 118 lowers along the inclined portion in the y2 direction from the horizontal portion, in which the moving pin 118*j* has been located in FIG. 37, and is moved to a position on the horizontal portion on the lower portion side.

Figure 38:
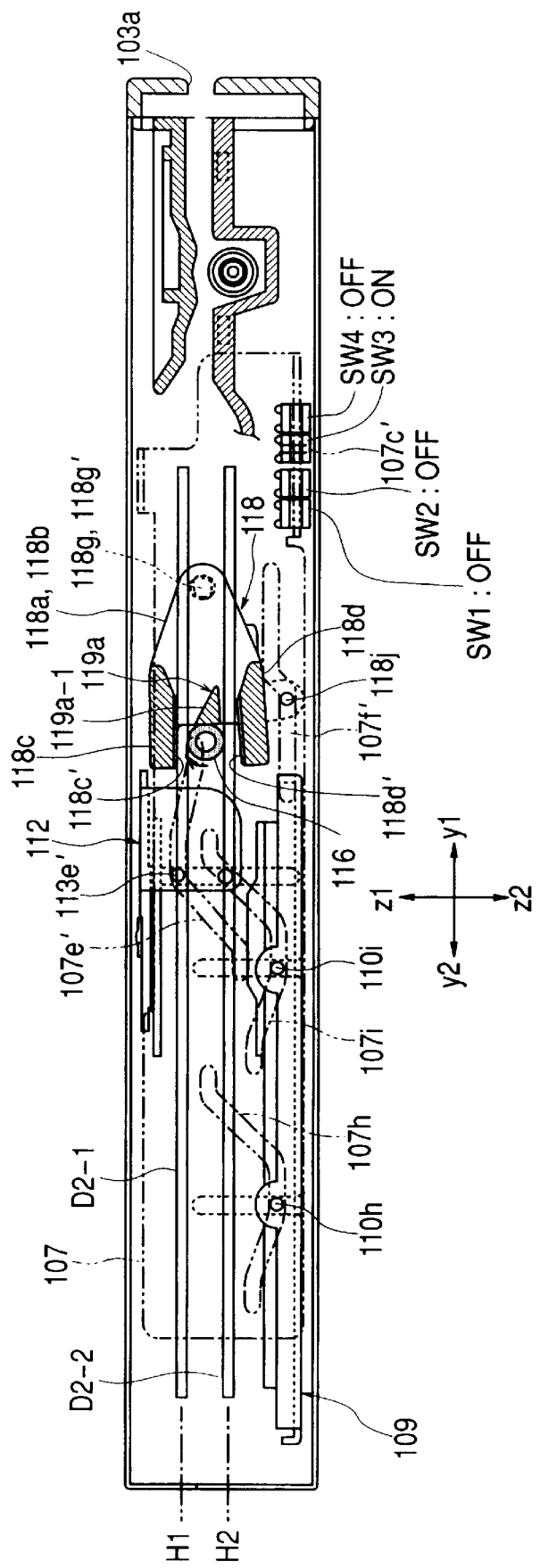
FIG. 38 is an explanatory view for illustrating an exchange operation of disks in the disk device according to an embodiment of the present invention.

At this time, the side plate 118*a* (118*b*) of the pressing member 118 rotates by a predetermined angle around the rotating shaft 118*g* (118*g*') in counterclockwise direction in FIG. 38 from the state of FIG. 37 for causing the pressing plate 118*c*, 118*d* to pivot and move downward.

Accordingly, in this state, clearance between the pressing surface 118*c*' of the pressing plate 118*c* and the upper roller portion of the transferring roller 116 becomes narrower, and on the contrary, clearance between the pressing surface 118*d*' of the pressing plate 118*d* and the lower roller portion of the transferring roller 116 becomes wider (state of first position of rotation).

With the rotation of the side plate 118*a* (118*b*), the engaging shaft 119*b* (119*b*') (See FIG. 36 in either case)of the distributing plate 119 for engaging with the cut-off portion 118*a*-3 (118*b*-3) of the side plate 118*a* (118*b*) is pressed downwardly, whereby the division unit 119*a* rotates, from the state of FIG. 37, by a predetermined angle around the rotating shaft 117 in clockwise direction in FIG. 38 to move downward while shaking the head. In this state, the upper surface 119*a*-1 of the division unit 119*a* is an inclined surface obliquely opposing to the insertion/ejection slot 103*a*.

Also, at the second position, the upper moving pin 113*e*' of the clamp member 112 only moves on the horizontal portion at the same position of the cam groove 107*e*' as shown in FIG. 37, the moving pin 110*h*, 110*i* of the driving unit 109 only moves on the horizontal portion of the cam groove 107*h*, 107*i* at the same height position as shown in FIG. 37, and the clamp member 112 and the driving unit 109 maintain the state of the second position shown in FIG. 37 (third position).

In this respect, at the third position, the optical detection switches SW1 to SW4 detect OFF, OFF, ON and OFF states respectively, whereby the movable member 107 is adapted to be able to stop its movement.

Figure 39:
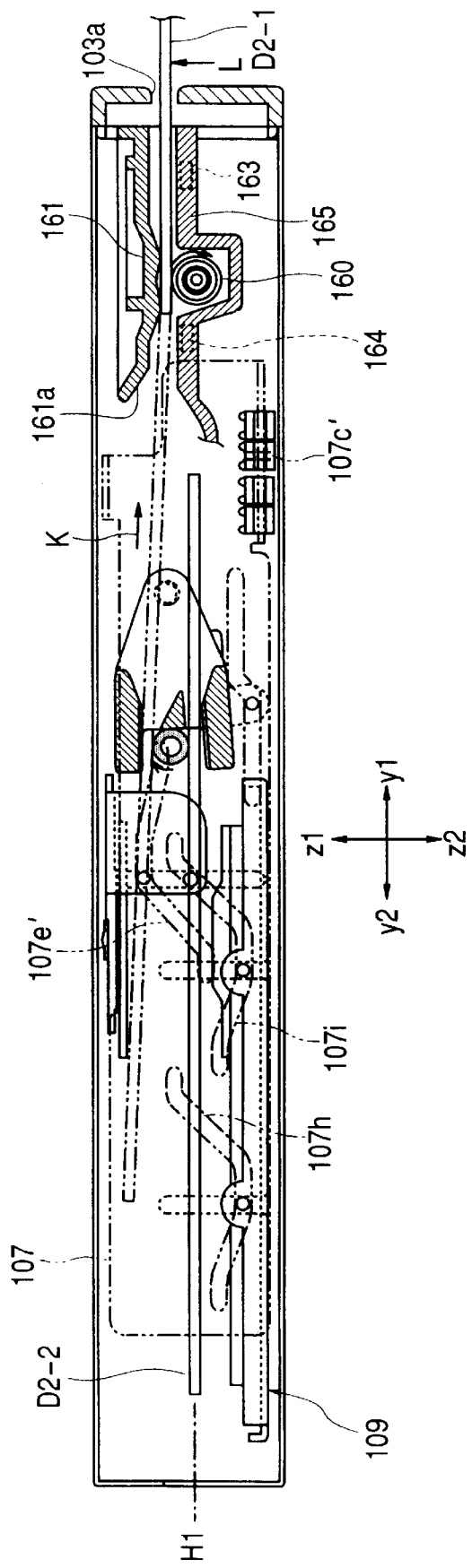
FIG. 39 is an explanatory view for illustrating an exchange operation of disks in the disk device according to an embodiment of the present invention.

At the third position, the transferring roller 116 is continuously rotated in clockwise direction from the state of the second position shown in FIG. 37, and the disk D2-1 is sandwiched between the pressing surface 118*c*' of the pressing plate 118*c* and the upper roller portion of the transferring roller 116, whereby the disk D2-1 is transferred from the first driving position H1 in the upper guide means 151 toward the insertion/ejection slot 103*a* through the upper transferring path as indicated by an arrow K in FIG. 39.

At this time, after it is fed while sliding along the under surface 161a of the pressing plate 161, the end portion of the disk D2-1 on the y1 side is sandwiched between the upper part side of the feeding roller 160 and the pressing plate 161. A feeding force of the feeding roller 160 in clockwise direction is supplied to the disk D2-1 to convey it in the y1 direction, and the disk D2-1 is finally ejected through the insertion/ejection slot 103a.

At this time, when the end portion of the disk D2-1 in the y2 direction is positioned at a position (state of L in FIG. 39) slightly beyond the detection switch 164, the detection switch 164 detects the end portion of the disk D2-1 in the y2 direction to stop the rotation of the feeding roller 160 and the transferring roller 116.

By doing as described above, the disk D2-1 stops with the end portion thereof on the y2 side sandwiched between the feeding roller 160 and the pressing plate 161, and it becomes possible to prevent the disk D2-1 from falling during ejection. Also, withdrawal of the disk D2-1 from the disk device 100 can be easily performed by manually drawing the disk D2-1 out in the y1 direction lightly.

Figure 40:
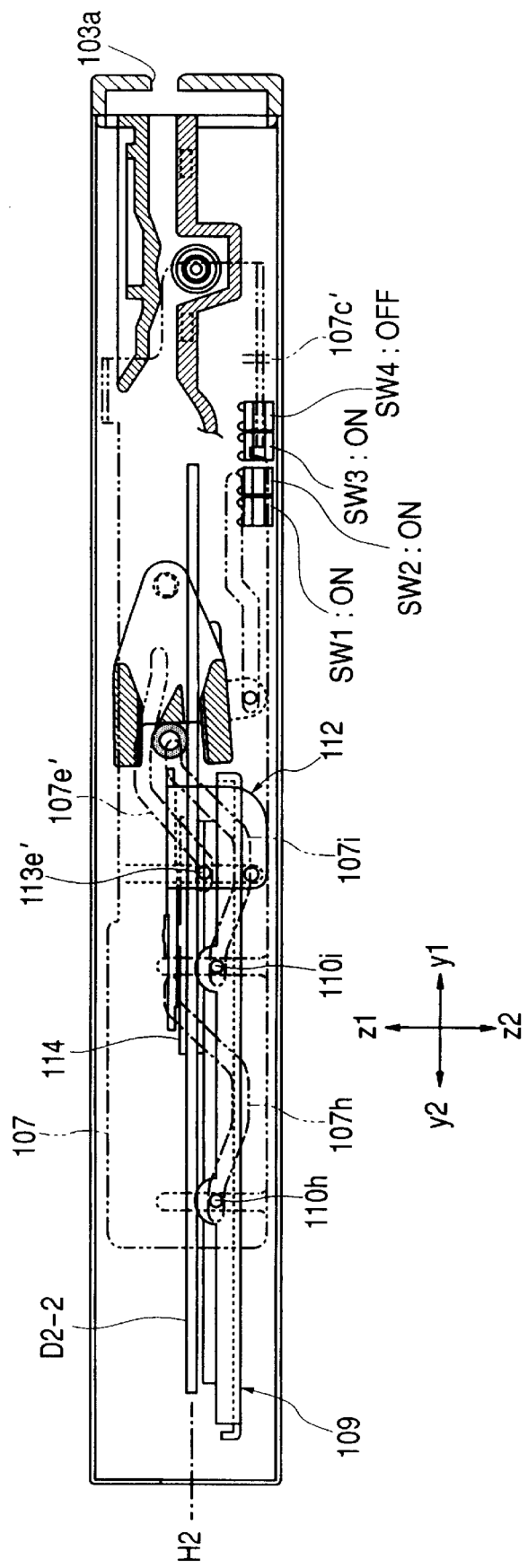
FIG. 40 is an explanatory view for illustrating an exchange operation of disks in the disk device according to an embodiment of the present invention.
Figure 41:
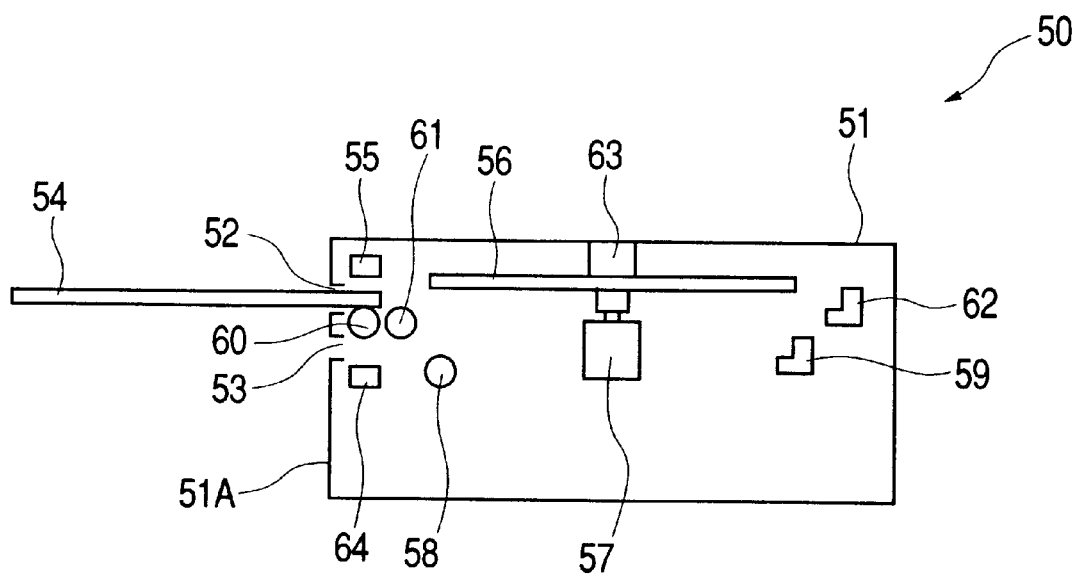
FIG. 41 is an explanatory view for illustrating a conventional disk device.

Next, when the completion of ejection of the disk D2-1 is detected by the detection switch 163, the movable member 107 is moved in the y1 direction again. When the movable member 107 moves in the y1 direction shown as shown in FIG. 40, the upper moving pin 113e' of the clamp member 112 descends along the inclined portion in the y2 direction from the horizontal portion of the cam groove 107e' at the position of FIG. 39 for moving to reach the horizontal portion on the y2 direction side, and the clamp member 112 is lowered to a lower position than the first position (See FIG. 36) in the z2 direction.

Also, the moving pin 110h, 110i of the driving unit 109 ascends from the horizontal portion of the cam groove 107h, 107i at the position of FIG. 39 on the inclined portion in the y2 direction for moving upward to reach the horizontal portion on the y2 direction side, and the driving unit 109 is caused to ascend to a lower position than the first position (See FIG. 36) in the z1 direction.

In this process, the disk D2-2, which has been held by the lower guide means 150, is placed on the turntable Ta. Since a clamper 114 of the clamp member 112 chucks the turntable Ta, the disk D2-2 enters a clamped state, in which it is sandwiched between the turntable Ta and the clamper 114 (fourth position).

In this respect, at the fourth position, the optical detection switches SW1 to SW4 detect ON, ON, ON and OFF states respectively, whereby the movable member 107 is adapted to be able to stop its movement.

At the fourth position, the disk D2-2 is reproduced by the recording/reproducing means (not shown) provided in the driving unit 109.

Next, with reference to FIGS. 36 to 40, the description will be briefly made of a case where a new disk D2-3 (not shown) has been inserted into the insertion/ejection slot 103a when the disk D2-2 is being reproduced at the driving position H2 as shown in FIG. 40.

When a disk D2-3 is inserted into the insertion/ejection slot 103a, it is detected by the detection switch 163 to stop the recording/reproducing operation of the disk D2-2. Thus, the movable member 107 is moved to a third position shown in FIG. 38. Accordingly, the clamper member 112 ascends along the cam groove 107e', and the driving unit 109 descends along the cam groove 107h, 107I, whereby the clamper 114 and the turn table Ta are spaced apart from each other so that the disk D2-2 becomes unclamped.

In this state, the disk D2-3 is transferred into the disk device 100, and the operation during the transfer is the same as the above-described case. However, the transferring roller 116 is rotated in counterclockwise direction, and the transferring direction of the disk D2-3 is changed over upwardly along the upper surface 119a-1 of the division unit 119a, and the disk D2-3 is held at a driving position H1 in the upper guide means 151.

Further, when the movable member 107 moves in the y2 direction and is positioned at the second position indicated in FIG. 37, the disk D2-2 is sandwiched between the pressing surface 118d' of the pressing plate 118d and the transferring roller 116, and is transferred on the insertion/ejection slot 103a side. At this time, the transferring roller 116 is rotated in counterclockwise direction.

A clockwise rotation of the feeding roller 160 transfers the disk D2-2 from the insertion/ejection slot 103a outside the disk device 100 in a state in which it is sandwiched between the feeding roller 160 and the pressing plate 161.

When carrying-out of the disk D2-2 is completed, the movable member 107 further moves in the y2 direction to position at the first position indicated in FIG. 36, and the clamp member 112 descends along the inclined portion of the cam groove 107e', reaching the driving position H1. A driving chassis 109 ascends along the inclined portion of the cam groove 107h, 107i and reaches the driving position H1 similarly.

Thus, the clamper 114 chucks the turntable Ta, whereby the disk D2-3 is sandwiched to become clamped, and at the first driving position H1, the disk D2-3 is reproduced by the recording/reproducing means (not shown) provided in the driving unit 109.

As described above, in the above-described disk device 100, the disk D can be reproduced at two places when the clamp member 112 and the driving chassis 109 are at the first driving position H1 and the second driving position H2, respectively. In the case where a new disk D is inserted into the insertion/ejection slot 103a when for example, the clamp member 112 and the driving chassis 109 are at the first driving position H1 and the disk D is being reproduced, the disk D is replaced with a new disk D in a process, in which the clamp member 112 and the driving chassis 109 are moving to the second driving position H2, and the new disk D is reproduced at the second driving position H2.

On the contrary, in the case where a new disk D is inserted when the clamp member 112 and the driving chassis 109 are at the second driving position H2 and the disk D is being reproduced, the disk D is replaced with a new disk D in a process, in which the clamp member 112 and the driving chassis 109 are moving to the first driving position H1, and the new disk D is reproduced at the first driving position H1.

At this time, when the new disk D is transferred to the first or second driving position H1, H2 within the disk device 100, the direction of the disk D can be changed over to either of the directions of the positions H1 and H2 by the distributing plate 119 to directly feed the disk D the first or second driving position H1, H2 disposed in an extension of the course. Therefore, it may not be necessary to once hold the disk by holding means and to move this holding means up and down for thereby moving the disk to a predetermined driving position unlike the conventional case, but it is possible to shorten the transferring time for the disk D, and to thereby shorten replacement time for the disk D. Also, even during ejecting the disk D, the disk D can be taken out by sending it back to the insertion/ejection slot 103a side immediately from the first or second driving position H1, H2, and therefore, it may not be necessary to once hold the disk by the holding means and to move the holding means up and down to thereby move the disk to the inserting/ejecting position even during the ejection unlike the conventional case, but it is possible to further shorten the replacement time for the disk D.

Also, since the ejected disk is sandwiched in the vicinity of the insertion/ejection slot 103a, it is possible to prevent the disk from falling. In other words, the ejected second disk does not have to be removed immediately. Accordingly, when used as, for example, an in-vehicle disk device, the disk can be left as it is, for example, until the vehicle is stopped, and therefore, it is not necessary to remove the disk during driving, but the operativity can be improved. Further, the disk can also be replaced again by pushing the ejected disk in again.

In this respect, in the present embodiment, the description has been made of a state in which the first disk has been present within the disk device 100 when a new disk is transferred to either of the first and second driving positions H1 and H2, but even in a case where a new disk is inserted when the first disk is not present within the disk device 100, it goes without saying that the new disk can be loaded into the disk device 100 only by inserting it into the insertion/ejection slot 103a.

Although the description has been made of an replacement operation of the disk D when as the disk D, the disk D2 of an ordinary size is used, the present invention is applicable to the small-diameter type disk D1.

As described above, according to the present invention, there is provided a disk device wherein an insertion/ejection slot for inserting or ejecting a disk, and two upper and lower disk transferring paths connected to the insertion/ejection slot are provided; between the upper transferring path and the lower transferring path, a transferring roller for transferring a disk is disposed in such a manner as to be rotatable in a forward or backward direction; an upper roller portion and a lower roller portion of the transferring roller are disposed so as to face the upper and lower transferring paths, respectively; in the upper roller portion and the lower roller portion, there are provided pressing members, having pressing surfaces to be arranged so as to oppose to each other; at least one of the transferring roller and the pressing member is made movable in a direction to be brought into and out of contact; and the disk is caught between the pressing surface and the upper roller portion, or between the pressing surface and the lower roller portion to rotate the transferring roller in a forward direction or a backward direction for thereby transferring the disk, whereby there is no need for disposing a transferring roller in the upper transferring path and the lower transferring path respectively, and it becomes possible to convey the disk in the upper and lower transferring paths by one transferring roller, and therefore, the structure can be simplified and the component count can also be reduced. Also, there has been disposed a transferring roller between the upper transferring path and lower transferring path, whereby it becomes possible to dispose a driving mechanism for driving the transferring roller between the upper and lower transferring paths, so as not to protrude upward and downward from the upper and lower transferring paths respectively, thus making it possible to make the disk device thin.

Further, there is provided a disk device constructed such that there are provided a first driving position and a second driving position whereat disks are transferred along the upper and lower transferring paths, respectively; there are provided a driving unit capable of ascending and descending in a direction orthogonal to the disk surface, and a cam member, with which the driving unit comes into engagement; and the disk is mounted for driving by causing the driving unit to ascend or descend correspondingly to the disk transferred to either of the first and second driving positions in synchronization with the movement of the cam member to a predetermined position, wherein the pressing member is caused to engage with the cam member, and the pressing member is caused to move in synchronization with movement of the cam member to another predetermined position, whereby each of the pressing surfaces is caused to move in directions to be brought into and out of contact with the upper roller portion and the lower roller portion, respectively. Thereby, a mechanism for moving the pressing member is not discretely provided, but the pressing member is caused to engage with the cam member for causing the driving unit to ascend or descend so as to interlock the movement, and therefore, the structure can be simplified. Also, since the cam member can be used in common, the component count is not increased either.

Further, there is provided a disk device constructed such that there is provided one insertion/ejection slot, and there is provided a distributing mechanism for selectively changing over the transferring direction of the disk inserted through the insertion/ejection slot in the direction of the upper or lower transferring path, and the disk, whose direction has been changed over, is transferred along the upper or lower transferring path by a feeding force of the transferring roller. Thereby, in the case where a new disk is inserted when the disk is being driven, for example, at the first driving position, it is possible to drive the new disk at the second driving position by replacing the disk in a process in which the driving unit moves to the second driving position, and on the contrary, in the case where a new disk is inserted when the disk is being driven at the second driving position, it is possible to drive the new disk at the first driving position by replacing the disk in a process in which the driving unit moves to the first driving position. At this time, when the new disk is transferred to the first or second driving position, the direction of the disk is changed over to either of the directions of the first and second transferring paths by the distributing mechanism, and the disk can be directly fed to the first or second transferring path. Therefore, it is not necessary to lower the disk which has been already driven when the new disk is inserted on the lower feeding roller once for unloading, and thereafter to convey it to the ejection slot unlike the conventional case, but it is possible to shorten the transferring time for the disk and to thereby shorten the disk replacement time.

What is claimed is:

1. A disk device wherein an insertion/ejection slot for inserting or ejecting a first disk and a second disk, and a transferring roller for transferring the first disk and the second disk are provided, the treansferring roller having an upper roller portion and a lower roller portion and being rotatable in a forward/backward direction;

an upper transferring path for transferring the first disk inserted through the insertion/ejection slot to a first driving position disposed above the transferring roller and a lower transferring path for transferring the a second disk inserted through the insertion/ejection slot to a second driving position disposed below the transferring roller; and a pressing member having an upper pressing surface and a lower pressing surface, the upper pressing surface facing the upper roller portion of the transferring roller across the upper transferring path and the lower pressing surface facing the lower roller portion of the transferring roller across the lower transferring path;

wherein the pressing member is pivotable in a vertical direction so that one of the upper pressing surface and the lower pressing surface is selectively moved toward/away from the transferring roller; and wherein the first disk is caught between the upper pressing surface and the upper roller portion and is transferred to the first driving position when the first disk moves along the upper transferring path, and wherein the second disk is caught between the lower pressing surface and the lower roller portion and is transferred to the second driving position when the second disk moves along the lower transferring path.

2. A disk device according to claim 1, wherein there are provided a driving unit capable of ascending and descending in a direction orthogonal to a disk surface, and a cam member with which the driving unit comes into engagement; and wherein either the first disk or the second disk is mounted for driving by causing the driving unit to ascend or descend correspondingly to either the first disk transferred to the first driving position or the second disk transferred to the second driving position in synchronization with movement of the cam member to a predetermined position, further wherein the pressing member is caused to engage with the cam member, and the pressing member is caused to pivot vertically in synchronization with movement of the cam member to another predetermined position, whereby each of the pressing surfaces is caused to move in a direction to be brought into and out of contact with the upper roller portion and the lower roller portion, respectively.

3. A disk device according to claim 1, wherein there is provided a distributing mechanism for selectively changing over the transferring direction of the first disk or the second disk inserted through the insertion/ejection slot to the direction of the upper or lower transferring path, respectively, and the first disk or the second disk, whose direction has been changed over, is transferred along the upper or lower transferring path, respectively, by a feeding force of the transferring roller.

* * * * *

UNITED STATES PATENT AND TRADEMARK OFFICE
CERTIFICATE OF CORRECTION

PATENT NO.      : 6,594,218 B2
DATED           : July 15, 2003
INVENTOR(S)     : Hideo Kikuchi et al.

It is certified that error appears in the above-identified patent and that said Letters Patent is hereby corrected as shown below:

<u>Column 1,</u>
Line 4, delete "treansferring" and substitute -- transferring -- in its place.

Signed and Sealed this

Fourteenth Day of October, 2003

JAMES E. ROGAN
*Director of the United States Patent and Trademark Office*